United States Patent
Kiziltas et al.

(10) Patent No.: US 11,542,379 B2
(45) Date of Patent: Jan. 3, 2023

(54) POLYURETHANE FOAMS CONTAINING ADDITIVE MANUFACTURING WASTE AS FILLER FOR AUTOMOTIVE APPLICATIONS AND PROCESSES FOR MANUFACTURING THE SAME

(71) Applicant: Ford Global Technologies, LLC, Dearborn, MI (US)

(72) Inventors: Alper Kiziltas, Kars (TR); Zachary Dowling, Saline, MI (US); Matthew Linden Bedell, Houston, TX (US); Deborah Mielewski, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 166 days.

(21) Appl. No.: 16/754,609

(22) PCT Filed: Sep. 28, 2018

(86) PCT No.: PCT/US2018/053344
§ 371 (c)(1),
(2) Date: Apr. 8, 2020

(87) PCT Pub. No.: WO2019/067856
PCT Pub. Date: Apr. 4, 2019

(65) Prior Publication Data
US 2021/0363317 A1    Nov. 25, 2021

Related U.S. Application Data

(60) Provisional application No. 62/564,987, filed on Sep. 28, 2017.

(51) Int. Cl.
| | |
|---|---|
| *C08G 18/32* | (2006.01) |
| *C08G 18/40* | (2006.01) |
| *C08G 18/42* | (2006.01) |
| *C08G 18/44* | (2006.01) |
| *C08G 18/48* | (2006.01) |
| *C08G 18/66* | (2006.01) |
| *C08G 18/76* | (2006.01) |
| *C08J 9/00* | (2006.01) |
| *C08L 75/04* | (2006.01) |
| *C08L 75/08* | (2006.01) |

(52) U.S. Cl.
CPC ............ *C08J 9/0061* (2013.01); *C08L 75/08* (2013.01); *C08J 2205/044* (2013.01); *C08J 2205/05* (2013.01); *C08J 2205/06* (2013.01); *C08J 2375/08* (2013.01); *C08J 2477/02* (2013.01); *C08L 2203/14* (2013.01); *C08L 2207/20* (2013.01)

(58) Field of Classification Search
CPC ...................................................... B33Y 99/00
See application file for complete search history.

(56) References Cited

U.S. PATENT DOCUMENTS

| | | | |
|---|---|---|---|
| 6,245,281 B1 | 6/2001 | Scholten et al. | |
| 2011/0052927 A1 | 3/2011 | Martinoni et al. | |
| 2017/0152343 A1* | 6/2017 | Gunther | C08G 18/7621 |
| 2017/0158816 A1 | 6/2017 | Martinoni et al. | |
| 2017/0266882 A1 | 9/2017 | Yan et al. | |

FOREIGN PATENT DOCUMENTS

| | | | |
|---|---|---|---|
| AT | 318929 B | * | 11/1974 |
| DE | 2204278 A1 | | 8/1973 |
| WO | WO2009114715 A2 | | 9/2009 |
| WO | WO2016020139 | * | 2/2016 |

OTHER PUBLICATIONS

Machine translation of AT 318929B obtained from the European Patent Office website in Nov. 2021 (Year: 2021).*
Pham et al., "Deterioration of polyamide powder properties in the laser sintering process", 2008, Proc. IMechE vol. 222 Part C: J. Mechanical Engineering Science, p. 2163-2176 (Year: 2008).*
International Search Report of the International Searching Authority for PCT/US2018/053344 dated Jan. 31, 2019.

* cited by examiner

*Primary Examiner* — Melissa A Rioja
(74) *Attorney, Agent, or Firm* — Burris Law, PLLC

(57) ABSTRACT

A closed loop recycling process of manufacturing a foam part includes dispersing a filler material recycled from an additive manufacturing (AM) process in at least one foam reactant and pouring or injecting the at least one foam reactant with the filler material into a mold and forming the foam part. The foam part has a foam matrix with between 2.5 wt. % and 30 wt. % of the filler material. The filler material can be a recycled powder from a selective laser sintering process that is not graded (i.e., sized) before being dispersed in the at least one foam reactant. For example, the recycled powder can be a recycled polyamide 12 (rPA12) powder with an average particle diameter of less than 100 micrometers. Also, the least one foam reactant can be a polyol reactant and an isocyanate reactant such that a polyurethane foam matrix with recycled rPA12 filler material is formed.

20 Claims, 8 Drawing Sheets

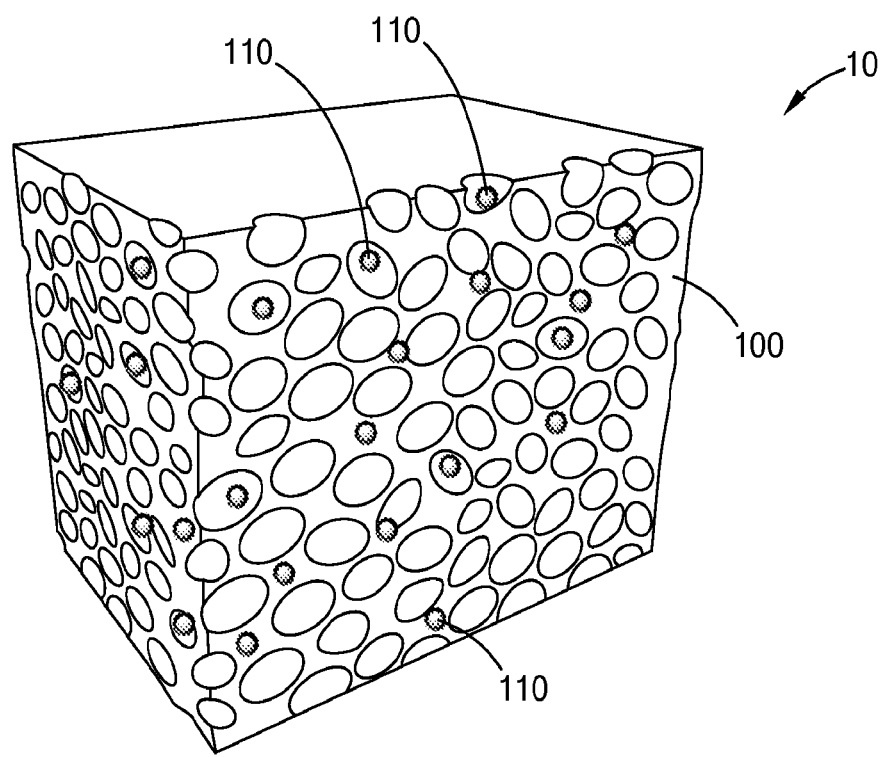
FIG. 1
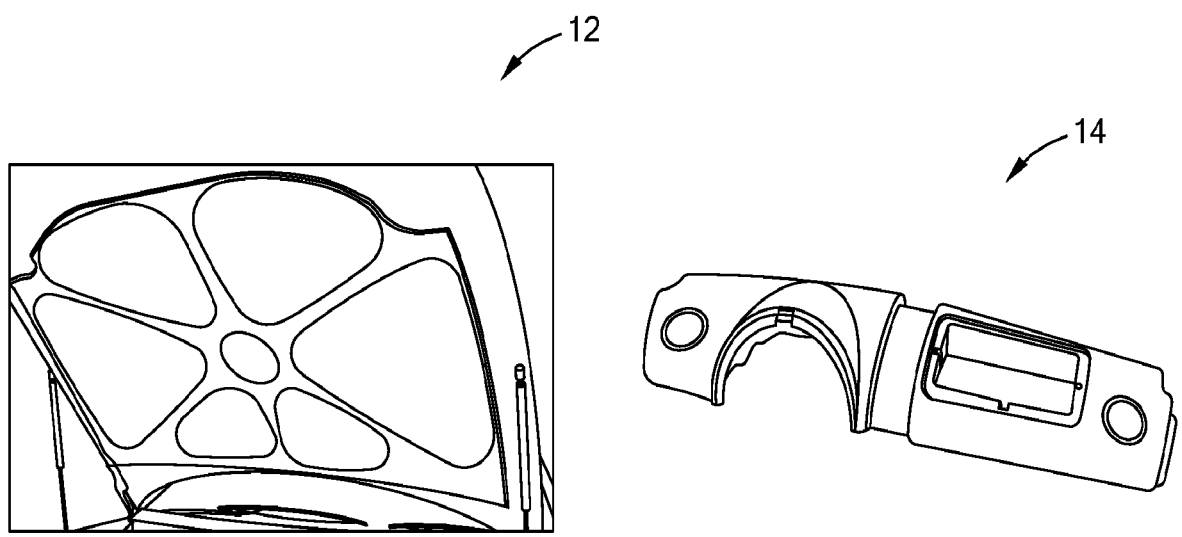
FIG. 1A
FIG. 1B

POLYURETHANE FOAMS CONTAINING ADDITIVE MANUFACTURING WASTE AS FILLER FOR AUTOMOTIVE APPLICATIONS AND PROCESSES FOR MANUFACTURING THE SAME

CROSS-REFERENCE TO RELATED APPLICATIONS

This application claims the benefit of and priority to U.S. Provisional Application No. 62/564,987 filed on Sep. 28, 2017. The disclosure of the above application is incorporated herein by reference.

FIELD

The present disclosure relates to polyurethane foams and processes of manufacturing the same, and particularly, polyurethane foams with a filler material recycled from a selective laser sintering process processes of manufacturing the same.

BACKGROUND

The statements in this section merely provide background information related to the present disclosure and may not constitute prior art.

Polyurethanes (PU) have been utilized in the automotive industry due to the flexibility and ease of chemistry manipulation. Foams made from PU, i.e., PU foam, can be a rigid foam or a flexible foam depending on the characteristics of the PU reactants. Accordingly, PU foams have many different applications. The flexible PU foams have an open-cell, flexible matrix, and are comprised of open-cavities contained in a supporting structure made from poly-urea and poly-urethane linkages.

Polyurethanes (PUs) are traditionally synthesized from oil-refined precursor chemicals and the current industrial practice of using petroleum-sourced reactants for the mass production of PU's is not a renewable sustainable approach. Also, PUs are the sixth most globally produced plastic polymer and using petroleum-sourced reactants for the mass production of PUs has an effect on a worldwide scale due to the size of the global market. As a result, the production of PU reactants, namely polyols and isocyanates, is of a non-trivial volume, and their manufacturing processes carry a large environmental effect. For example, the greenhouse gas impact for the production of conventional polyether polyols is 3.57 kg $CO_2$-eq per 1 kg polyol, plus an additional 0.36 kWh that contributes to further pollution, because that energy in most cases is still sourced from the burning of coal or natural gas.

SUMMARY

In one form, a process of manufacturing a foam part includes dispersing a filler material recycled from an additive manufacturing (AM) process in at least one foam reactant and pouring or injecting the at least one foam reactant with the filler material into a mold and forming the foam part. In some aspects, the foam part comprises a foam matrix with between 2.5 wt. % and 30 wt. % of the filler material. In such aspects, the filler material can be a recycled powder from a selective laser sintering (SLS) process that is not graded (i.e., sized) before being dispersed in the at least one foam reactant. For example, the recycled powder can be a recycled polyamide 12 (rPA12) powder with an average particle diameter of less than 100 micrometers (μm). Also, recycling the rPA12 powder, and other AM filler materials disclosed herein, provides a closed loop recycling process for forming the foam part. In some aspects of the present disclosure, the at least one foam reactant comprises a polyol reactant and an isocyanate foam reactant and a polyurethane (PU) foam part is formed. In such aspects, the foam part may include open-cell flexible PU foam matrix with an average cell size less than 400 μm. Also, the polyol reactant may be petroleum-based and/or synthesized from $CO_2$ and/or a bio-based oil such as soybean oil, palm oil, rapeseed oil, and/or castor oil.

In another form, a foam with a polyurethane foam matrix and a filler material comprising waste from an AM process is provided. In some aspects, the waste from the AM process is recycled rPA12 powder from a SLS process and the foam has a flexible foam matrix with between 2.5 wt. % and 30 wt. % rPA12 powder. The polyurethane foam matrix is used to form foam products for the automotive industry, such as seat cushioning, headliners, carpet insulation, sound absorption components, vibration dampening materials, an under-hood material, and an engine cover.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 1 is a schematic perspective view of a foam in accordance with the teachings of the present disclosure;

FIG. 1A is a schematic perspective view of a foam part formed from the foam in FIG. 1;

FIG. 1B is a schematic perspective view of a foam part formed from the foam in FIG. 1;

DETAILED DESCRIPTION

Figure 2:
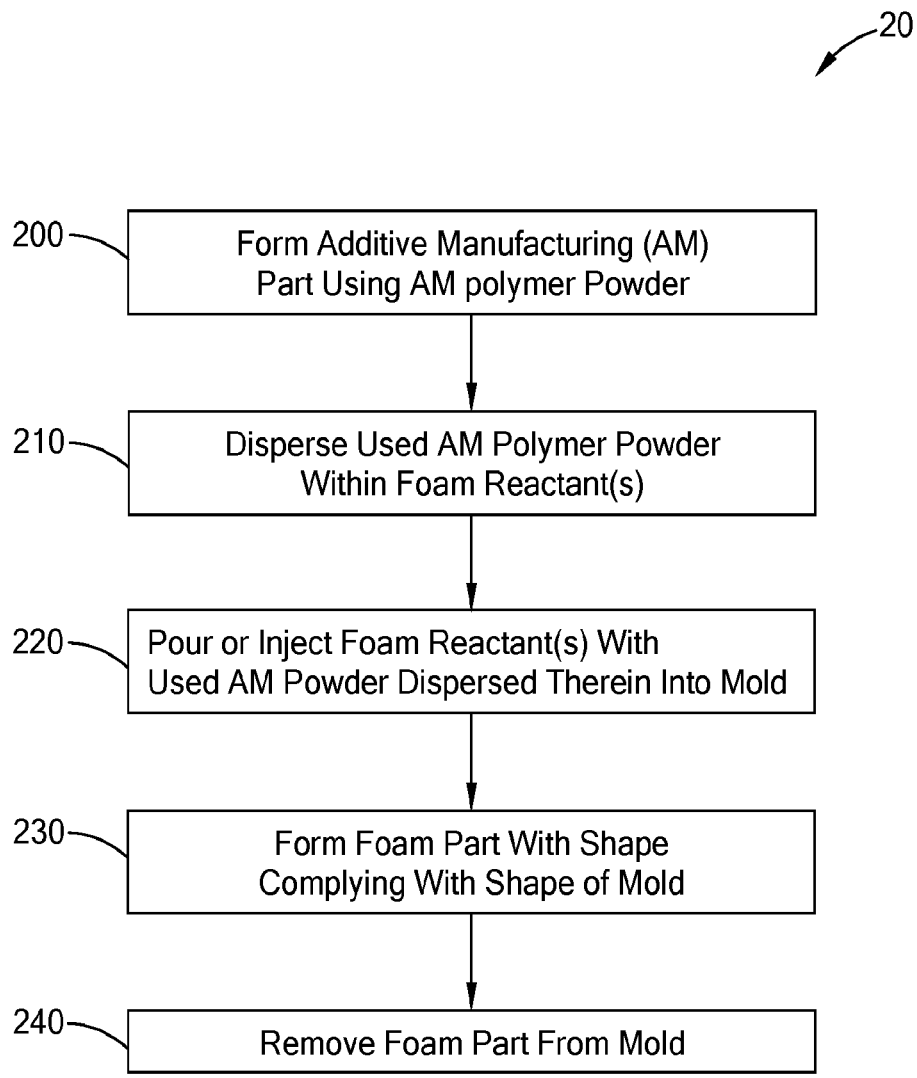
FIG. 2 is a flow chart for a process for making a foam part in accordance with the teachings of the present disclosure.

The following description is merely exemplary in nature and is not intended to limit the present disclosure, application, or uses.

Referring now to FIG. 1, a schematic perspective view of a foam 10 in accordance with the teaching of the present disclosure is shown. The foam 10 includes a foam matrix 100 with filler material 110 recycled from an additive manufacturing (AM) process e.g., recycled powder) dispersed within the foam matrix 100. While FIG. 1 schematically depicts the filler material 110 in the form of particles within the foam matrix 100, it should be understood that in some aspects of the present disclosure some or all of the filler material 110 may be completely blended within the foam matrix 100, i.e., discrete particles of the filler material 110 may not be present within the foam matrix 100.

The foam 10 may take the form of any known or yet to be developed soft foam part or rigid foam part. Non-limiting examples of soft foam parts include vehicle under hood insulation 12 as schematically depicted in FIG. 1A, porous ducts, seating components, armrest pads, center console supports, acoustic insulation, and the like. Non-limiting examples of rigid foam parts include a vehicle instrument panel 14 as schematically depicted in FIG. 1B, pillar components, bumper components, console components, and the like.

Non-limiting examples of polymers used to form the foam matrix 100 (i.e., a soft and/or rigid foam matrix) include polyurethane (PU), ethylene-vinyl acetate (EVA), low-density polyethylene (LDPE), nitrile rubber (NBR), polychloroprene (Neoprene), polyimide, polypropylene (PP), polystyrene (PS), polyethylene (PE), polyvinyl chloride (PVC), silicone, and the like. In some aspects of the present disclosure, the polymer is PU formed from polyol and isocyanate reactants. The polyols may include hydroxyl-terminated polyethers, hydroxyl-terminated polyesters, or a combination thereof. Non-limiting examples of polyols used to produce PU include petroleum synthesized polyols, a bio-based synthesized polyol derived from soybean oil, palm oil, rapeseed oil, castor oil, and the like, $CO_2$ synthesized polyols, or a combination thereof. Non-limiting examples of isocyanates used to produce PU include toluene diisocyanate (DI) and methylene diphenyl diisocyanate (MDI). It should be understood that other polyol and isocyanates reactants may be used to form the foams disclosed in the present disclosure.

Non-limiting examples of additive manufacturing waste used as the filler material 110 include recycled polyamide 12 (rPA12) powder, recycled polyamide 6 (rPA6) powder, recycled polyamide 11 (rPA11) powder, recycled carbon-reinforced polyamide powder, recycled glass-reinforced polyamide powder, recycled polyether ether ketone (PEEK) powder, recycled polyetherketoneketone (PEKK) powder, and the like. As used herein, the term "recycled" refers to powders that have been used at least once during an additive manufacturing (AM) process, e.g., a selective laser sintering (SLS) process. In some aspects of the present disclosure, the recycled powders disclosed herein have experienced heat damage from the AM process and if used in a subsequent AM process result in an AM produced part having less than desired physical, thermal, and/or mechanical properties. The recycled powders have an average diameter of less than 100 µm, for example, between 10 µm and 90 µm, between 20 µm and 80 µm, between 30 µm and 70 µm, between 40 µm and 70 µm, and/or between 50 µm and 70 µm.

Referring now to FIG. 2, a flow chart for a method 20 of making a foam part with AM waste as a filler material is schematically shown. The method 20 includes forming an AM part using an AM polymer powder at step 200. In some aspects of the present disclosure, the AM part is formed by a powder bed AM process, e.g., a selective laser sintering (SLS) SLS process. After the AM part is formed, or after a plurality of AM parts are formed by the AM process, at least some of the polymer powder that remains, i.e., at least some of the polymer powder not fused to make the AM part, is recycled by dispersing the polymer powder as a filler material within at least one foam reactant at step 210. It should be understood that the recycled polymer powder may have heat damage from the AM process and using the recycled polymer powder to form additional AM parts may result in the additionally formed AM parts having less than desirable mechanical properties, surface finish properties, etc. Also, polymer powder with such heat damage is typically removed from the AM process as waste and disposed of at landfills. Accordingly, one of the benefits of the foams and the methods for making foams in accordance with the teachings of the present disclosure is the reduction of landfill waste.

Still referring to FIG. 2, the at least one foam reactant with the AM polymer powder, and any other foam reactant(s), additives, etc., are poured or injected into a mold at step 220. The mixture of the at least one foam reactant, filler material in the form of the AM polymer powder, additives, etc., form a foam part with a shape complying with the shape of the mold at step 230 and the foam part is removed from the mold at step 240. In this manner, the AM polymer powder is recycled and not discarded as waste in landfills, waste incinerators, etc. Also, the AM polymer powder is supplied or provided for AM with a generally uniform particle size and does not have to be graded (i.e., sifted for size uniformity) before being used as a filler material in the foam part. It should be understood that use of the AM polymer powder as a filler material in the process for forming foam parts without being graded reduces the overall time and cost of producing the foam parts compared to using other types of known fillers such as clay, recycled tire granules, and the like. That is, since the AM polymer powder has been graded for the purpose of being used in the AM process, the recycled polymer powder has a uniform size and does not need to graded again before being dispersed in the at least one foam reactant.

As noted above, in some aspects of the present disclosure the foam 10 may have a PU matrix 100 formed from polymer-synthesized, $CO_2$-synthesized and/or bio-based synthesized polyols and isocyanate reactants. For example, $CO_2$-based polyols may be synthesized using Novomer's catalyst to copolymerize propylene oxide and carbon dioxide in equimolar proportions and yielding a polymer chain with a pure polycarbonate backbone with no ether or ester bonds. Also, the chains are terminated with the same number of hydroxyls as the initiator and there are no side reactions which cause a loss of functionality, i.e., diols have a functionality of 2.0 and triols have a functionality of 3.0. One such route for the synthesis of $CO_2$ polyols is shown by the Scheme 1 below.

Scheme 1

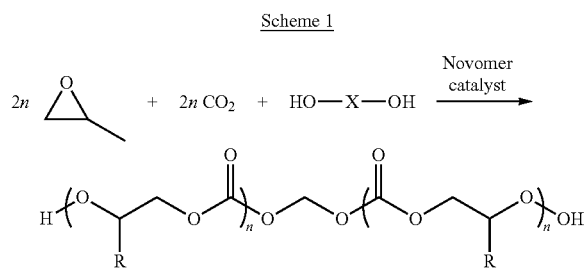

Regarding bio-based synthesized polyols, soybean oil may be used to form polyether polyols and polyester polyols as shown by Schemes 2 and 3, respectively, below.

Scheme 2

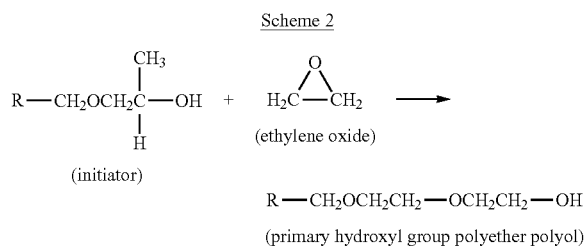

Scheme 3

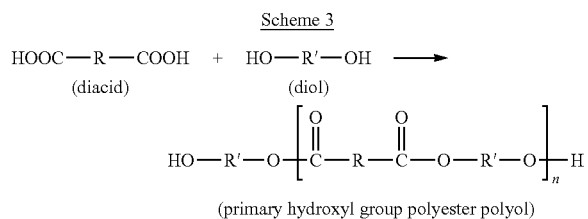

The filler material in the form of recycled AM polymer powder provides enhanced properties to the form part. In some aspects of the present disclosure, the recycled AM polymer powder as a filler material within a soft foam part increases the density of the soft foam part between about 5% and about 40%, for example between about 10% and about 30%; increases the compression modulus of the soft foam part between about 200% and 600%, for example between about 300% and 500%; and increases the compression stress of the foam, depending on the strain, between about 75% and about 500%, for example between about 100% and 400%. Also, the recycled AM polymer powder as a filler material within a soft foam part increases the 65/25 and 50/25 sag factors of the soft foam part between about 50% and 125% and between about 25% and 75%, respectively, for example between about 60% and 100% and between about 30% and 50%, respectively; increases the wet compression set of the soft foam part between about 10% and 60%, for example between about 30% and about 50%; increases the Young's modulus of the soft foam part between about 40% and about 80%, for example between about 50% and about 70%; increases the temperature at 50% mass loss of the soft foam part between about 2% and about 8%, for example between about 2% and about 6%; and increases the temperature at maximum rate of decomposition of the soft foam part between about 0.5% and 5%, for example between about 1% and about 4%.

Foam and foam parts in accordance with the teachings of the present disclosure may contain a range of filler material. In aspects of the present disclosure, foam parts have a filler material content, in weight percent (wt. %), between about 2.5% and about 30%. In some aspects of the present disclosure, foam parts have between about 4% and about 29% recycled AM polymer powder, for example between about 4% and about 8%, or between about 4% and about 15%. In other aspects of the present disclosure, foam parts have between about 8% and about 29% recycled AM polymer powder, for example between about 8% and about 15%. In still other aspects of the present disclosure, foam parts have between about 15% and about 29% recycled AM polymer powder.

In order to illustrate the benefits of using recycled AM waste as a filler in foam parts while not limiting the scope of the present disclosure, the following examples are provided.

Example Set 1

Flexible polyurethane foam samples were prepared using recycled polyamide 12 (rPA12) powder, sourced from additive manufacturing processes within the automotive industry, as a filler dispersed in petroleum-based polyether polyol in concentrations up to 29%, to determine whether the final foam products meet automotive standards for use in underhood applications. This embraces the concept of closed loop recycling, which is a production process in which post-consumer or industrial waste is collected and used to make new products within the originating industry. Characterization of the foam samples was carried out by morphological, physical, mechanical, and thermal analysis.

Flexible PU foams according to the first set of examples were formed by reacting polyols with polyisocyanates and by dispersing a filler material in the mixture of polyols and polyisocyanates. The polyols may be a petroleum-based polyether polyol, such as Voranol 4701® provided by Dow Chemical Co. (Midland, Mich.). The polyisocyanates may be a liquid blend of MDI series polyisocyanates such as Rubinate 7304® provided by Huntsman International LLC (Auburn Hills, Mich.).

The filler material may be recycled PA12 powder (rPA12), which is recycled from an automotive part prototyping process where virgin PA12 powder undergoes a selective laser sintering (SLS) process. During the SLS process, excess PA 12 material is generated as a waste. The excess PA12 that has undergone the SLS and that is wasted is collected and passed through a 245-micron sieving screen. Virgin material, which is precursor to recycled material, may be provided by EOS of North America, Inc. (Chanhassen, Minn.).

Properties of virgin PA12 powder are provided in Table 1, while properties of the polyol component are provided in Table 2, with data measured and provided by their respective suppliers.

TABLE 1

Properties of Virgin Fine Polyamide PA 2200 (virgin PA12 powder)

| Property | Method | Value | Unit |
|---|---|---|---|
| Average particle size | Laser diffraction | 60 | μm |
| Density | ASTM D792 | 0.95 | g/cm³ |
| Melting point | DSC | 184 | ° C. |

TABLE 2

Physical and chemical properties of Voranol 4701
(petroleum-based polyether polyol)

| Property | Value | Unit |
|---|---|---|
| Functionality | 3.0 | |
| Molecular weight | 4,900 | g/mol, GPC |
| OH number | 34 | mg KOH/g |
| Density | 1.02 | g/mL |
| Viscosity | 860 | cPs at 25° C. |

Additives used in foam production include cell-opening reagent Lumulse POE (26) GLYC (Lambent Corporation, Gurnee, Ill.), silicone-based surfactant Tegostab B4690 (Lambent Corporation, Gurne, Ill.), and diethanolamine co-catalyst and cross-linker (Sigma Aldrich, St. Louis, Mo.). Amine catalysts Niax A300 and Niax A1 (Momentive Inc., Waterford, Ky.) were utilized to promote the gelling reaction between the polyol and isocyanate components. The blowing agent used for foam synthesis was deionized water. Formulations of tested foams, using the aforementioned reagents, are provided in Table 3. To assist in de-molding, the laboratory mold was coated with release agent Chem-Trend PU-11331 before each foam pour.

TABLE 3

| | | rPA12 Content (wt %) | | | | |
|---|---|---|---|---|---|---|
| | Component Type | 0% | 4% | 8% | 15% | 29% |
| Voranol 4701 | Petroleum Polyether Polyol | 100.0 | 100.0 | 100.0 | 100.0 | 100.0 |
| Lumulse POE (26) GLYC | Cell Opener | 1.0 | 1.0 | 1.0 | 1.0 | 1.0 |
| Tegostab B4690 | Surfactant | 0.5 | 0.5 | 0.5 | 0.5 | 0.5 |
| Diethanolamine (DEA) | Cross Linker | 1.5 | 1.5 | 1.5 | 1.5 | 1.5 |
| Niax A300 | Catalyst | 0.6 | 0.6 | 0.6 | 0.6 | 0.6 |
| Niax A1 | Catalyst | 0.3 | 0.3 | 0.3 | 0.3 | 0.3 |
| Deionized Water | Blowing Agent | 3.0 | 3.0 | 3.0 | 3.0 | 3.0 |
| Recycled Fine Polyamide PA 2200 (rPA12) | Filler | 0.0 | 4.1 | 8.3 | 17.8 | 39.9 |
| Rubinate 7304 | Diisocyanate (MDI) | 53.8 | 53.8 | 53.8 | 53.8 | 53.8 |

Preparation and mixing of the polyols and additives, as well as the one-step addition of the isocyanate component, was completed under a laboratory fume hood. The closed mold used to create foam samples, with dimensions of 30.5×30.5×5.1 cm$^3$, was coated with a release agent and preheated to 65° C. for 15 minutes prior to preparing the foam. Filler rPA12 powder, petroleum-based polyether polyol, and the additives were measured into an inert container. Foams were prepared by adding rPA12 powder to the petroleum-based polyether polyol at levels of 4%, 8%, 15%, and 29% (wt. % of rPA12 in polyol-filler blend). With each rPA12 formulation, a foam block containing 100% petroleum-based polyether polyol, Voranol 4701, with 0% rPA12 filler was made to capture variations in ambient lab conditions and serve as a control sample.

Filler particles were dispersed into polyol, and then the polyol and additives were blended by means of a standard lab-scale hand-mixing apparatus for three minutes at 1500 RPM.

In the reaction step, the required mass of isocyanate was then added and mixed for an additional 12 seconds. This mixture was immediately poured into the mold, and given 6 minutes to cure. After de-molding the foam block, compressive force was applied by hand to release any trapped gases. For final curing, foams were placed into a preheated oven at 65° C. for 30 minutes and allowed to sit at room temperature for an additional 12 hours.

Foams were cut to comply with the standard testing parameters of the equipment used to obtain physical, mechanical, and thermal properties. The blocks were cut using a band saw and stamped using a USM Hytronic Model B press. Tested samples were randomly selected in sets of six for testing of each foam formulation's mechanical properties. Tensile, tear, and compression tests were conducted using an Instron 3366 apparatus. Selected foam properties were obtained according to the standards outlined in Table 4.

TABLE 4

| Material Property | Technical Standard | Selected Test from Standard |
|---|---|---|
| Apparent density | ASTM 3574-08 | Test A |
| Compression force deflection | ASTM 3574-08 | Test C |
| Compression set (humidity chamber aging) | ASTM 3574-08 | Test L |
| Tensile strength at break | ASTM 3574-08 | Test E |

TABLE 4-continued

| Material Property | Technical Standard | Selected Test from Standard |
|---|---|---|
| Elongation at maximum load | ASTM 3574-08 | Test E |
| Tear strength | ASTM D 624 | Die C |

Foam thermal properties were examined using thermogravimetric analysis (TGA) and derivative thermogravimetric analysis (DTG) on a Mettler Toledo TGA/DCS 1, with Stare software. Three samples of approximately 10 mg in mass were selected from each foam formulation. The chamber cycled from 25° C. to 600° C., under nitrogen gas applied at 30 mL/min.

Data comparisons of all foam properties were made between foams containing rPA12 filler and reference foams made from unfilled petrochemical polyol. Microscopy of foam samples was performed on a Keyence VHX digital microscope at 200× magnification to categorize morphology (cell shape and size).

Physical, tensile, compressive, and thermal properties of flexible polyurethane foams made with petroleum-based polyether polyol and filled with rPA12 at levels of 0%, 4%, 8%, 15%, and 29% were compared using a one-way analysis of variance (ANOVA) followed by Tukey-Kramer honest significant difference (HSD) test at $\alpha=0.05$ with Minitab 17 Statistical Software; the results of which are provided in Table 5. Interpretation of these results are discussed in their respective sections.

foam (0% rPA12), while foams with 8% to 29% rPA12 filler had a greater frequency of cell sizes less than 300 μm compared to foams containing 0% and 4% rPA12 filler. Cell sized generally decreased and uniformity generally increased with increasing rPA12 content. The arrow in FIG.

TABLE 5

|  | Property | \multicolumn{10}{c}{rPA12 Content (wt %)} |
| --- | --- | --- | --- | --- | --- | --- | --- | --- | --- | --- | --- |
|  |  | 0% | | 4% | | 8% | | 15% | | 29% | |
| Compression | Density (kg/m³) | D | | D | (NC) | C | (+7%) | B | (+14%) | A | (+30%) |
|  | Compression Modulus (MPa) | E | | D | (+52%) | C | (+131%) | B | (+203%) | A | (+428%) |
|  | Stress at 25% Strain (kPa) | D | | C | (+33%) | B | (+76%) | A | (+101%) | A | (+124%) |
|  | Stress at 50% Strain (kPa) | E | | D | (+34%) | C | (+95%) | B | (+135%) | A | (+209%) |
|  | Stress at 65% Strain (kPa) | E | | D | (+43%) | C | (+115%) | B | (+167%) | A | (+300%) |
|  | SAG Factor (65%/25%) | C | | C | (NC) | B | (+22%) | B | (+33%) | A | (+79%) |
|  | SAG Factor (50%/25%) | C | | C | (NC) | B | (+11%) | B | (+17%) | A | (+38%) |
|  | Wet Compression Set (%) | D | | C | (+16%) | AB | (+33%) | BC | (+23%) | A | (+40%) |
| Tensile | Tensile Strength (kPa) | B | | AB | (NC) | A | (+21%) | B | (NC) | B | (NC) |
|  | Extension at Max Load (mm) | A | | A | (NC) | A | (NC) | B | (−24%) | B | (−27%) |
|  | Young's Modulus (MPa) | C | | C | (NC) | B | (+36%) | B | (+27%) | A | (+61%) |
|  | Tear Resistance (N/mm) | A | | A | (NC) | B | (−11%) | B | (−11%) | C | (−23%) |
| Thermal | 10% Mass Loss Temp (° C.) | A | | A | (NC) | A | (NC) | A | (NC) | A | (NC) |
|  | 50% Mass Loss Temp (° C.) | D | | C | (+2%) | BC | (+2%) | B | (+3%) | A | (+4%) |
|  | Residual Mass (%) | AB | | AB | (NC) | A | (NC) | A | (NC) | B | (NC) |
|  | Max Rate of Decomp (%/° C.) | A | | B | (−13%) | C | (−20%) | D | (−29%) | E | (−37%) |
|  | Max Rate of Decomp Temp (° C.) | B | | A | (+2%) | A | (+2%) | A | (+2%) | A | (+2%) |

Means within a given property that do not share a letter indicate a statistically significant difference. "NC" is no significant change on the addition of rPA12 at the given level compared to samples with 0% rPA12 ($\alpha=0.05$) and parentheses show the effect of rPA12 loading on the physical, mechanical, and thermal properties of filled foams in comparison to unfilled foam (0% rPA12).

Morphology, or the shape, structure, size and distribution of cells, plays a key factor in determining the properties of flexible polyurethane foams. Studies have shown that uniform and well distributed small cells act as a reinforcement within polyurethane foams by offering increased regions of concentrated bulk material, making foams more resistive to tensile and compressive stress and increasing sound absorption efficiency, which is a desired trait for foam automotive engine covers.

Figure 3A:
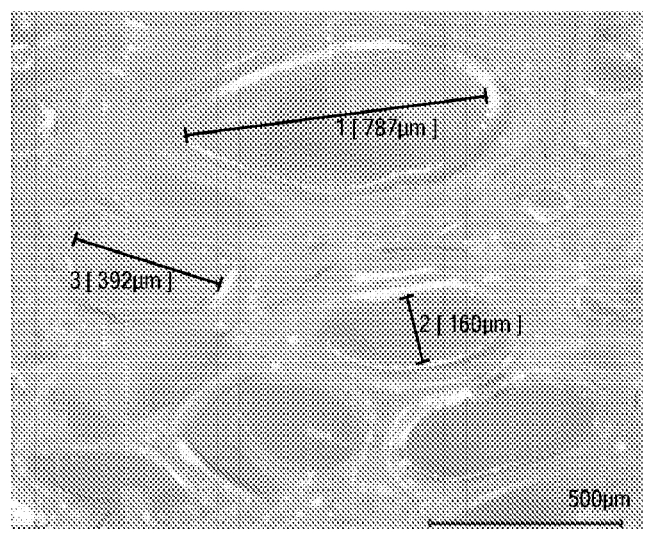
FIG. 3A is a microscopy image of a control foam sample with 0% recycled PA12 ("rPA12") filler.
Figure 3B:
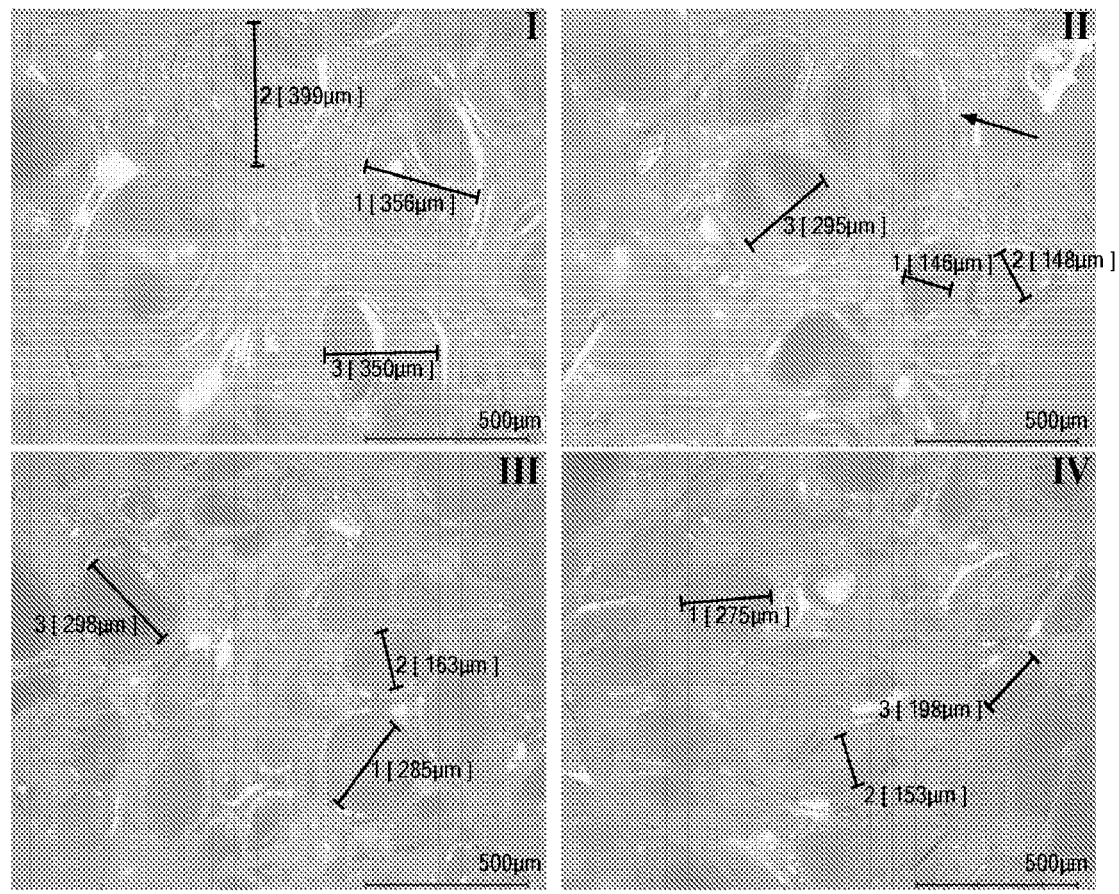
FIG. 3B is micrographs of foam samples containing of (I) 4%, (II) 8%, (III) 15%, and (IV) 29% of rPA12 filler.

Referring to FIGS. 3A and 3B, foam samples at each level of rPA12 filler content were observed under a microscope at 200× magnification. A microcopy image of unfilled foam is provided in FIG. 3A and images of rPA12-filled foams are provided in FIG. 3B, which were analyzed and compared to determine the effect of the rPA12 filler on cell size and structure.

Foams containing rPA12 filler had a greater frequency of cell sizes less than 400 μm at all levels compared to unfilled 3B image (II) indicates an example of rPA12 filler incorporated within the cell structure.

The decreased cell size and increased uniformity associated with the addition of rPA12 filler corresponds with fillers in polyurethane foams being correlated to an increased frequency of fine cells. However, in the case of optical microscopy, the relationship of cell size versus treatment is empirical, depending on observed values from each sample. This is further compounded by the non-homogenous nature of foam samples made on a laboratory scale, as cell geometry is often unique to each foam block. The effect of the differences in open cell size, distribution, and uniformity amongst treatment groups is further investigated in the following sections by analyzing trends pertaining to the foams' physical, mechanical, and thermal properties with relation to rPA12 filler content.

Referring now to Table 6 below, average values (Ave.) and standard deviation ($\sigma$) for the properties listed above in Table 5 for the flexible polyurethane foams made with petroleum-based polyether polyol and filled with rPA12 at levels of 0%, 4%, 8%, 15%, and 29% are shown. With reference to Tables 5 and 6, the properties in the tables are discussed below.

TABLE 6

| | \multicolumn{10}{c}{% of Filler} |
| --- | --- | --- | --- | --- | --- | --- | --- | --- | --- | --- |
| | 0% | | 4% | | 8% | | 15% | | 29% | |
| Property | Ave. | $\sigma$ | Ave. | $\sigma$ | Ave. | $\sigma$ | Ave. | $\sigma$ | Ave. | $\sigma$ |
| Density | 43.90 | 0.65 | 44.32 | 0.74 | 46.81 | 0.79 | 50.06 | 2.04 | 56.97 | 2.09 |
| Compression Modulus (MPa) | 0.05 | 0.00 | 0.07 | 0.00 | 0.11 | 0.01 | 0.14 | 0.00 | 0.25 | 0.02 |
| 25% CFD (kPa) | 3.53 | 0.22 | 4.68 | 0.35 | 6.19 | 0.23 | 7.09 | 0.54 | 7.91 | 0.93 |
| 50% CFD (kPa) | 5.71 | 0.23 | 7.68 | 0.42 | 11.14 | 0.56 | 13.43 | 0.77 | 17.65 | 1.53 |

TABLE 6-continued

| | % of Filler | | | | | | | | | |
|---|---|---|---|---|---|---|---|---|---|---|
| | 0% | | 4% | | 8% | | 15% | | 29% | |
| Property | Ave. | σ | Ave. | σ | Ave. | σ | Ave. | σ | Ave. | σ |
| 65% CFD (kPa) | 9.56 | 0.34 | 13.70 | 0.61 | 20.57 | 1.13 | 25.52 | 1.03 | 38.23 | 2.87 |
| SAG Factor 65%25% | 2.72 | 0.08 | 2.94 | 0.12 | 3.32 | 0.17 | 3.61 | 0.18 | 4.87 | 0.41 |
| Wet Compression Set (%) | 27.39 | 1.61 | 31.67 | 2.72 | 36.39 | 1.50 | 33.73 | 3.19 | 38.4 | 1.57 |
| Tensile Strength at Max Load (kPa) | 91.60 | 19.49 | 94.90 | 6.60 | 110.85 | 10.51 | 79.22 | 5.92 | 85.07 | 2.63 |
| Extension at Max Load (mm) | 80.57 | 15.31 | 86.54 | 8.10 | 84.32 | 8.65 | 61.41 | 4.30 | 58.49 | 2.76 |
| Young's Modulus (MPa) | 0.19 | 0.02 | 0.18 | 0.02 | 0.26 | 0.03 | 0.24 | 0.02 | 0.31 | 0.02 |
| Tear Resistance (N/mm) | 0.60 | 0.02 | 0.58 | 0.03 | 0.53 | 0.02 | 0.53 | 0.03 | 0.46 | 0.02 |
| 10% Mass Loss Temp (° C.) | 307.79 | 2.63 | 309.89 | 2.36 | 310.91 | 1.73 | 308.46 | 2.64 | 312.67 | 3.71 |
| 50% Mass Loss Temp (° C.) | 373.58 | 1.16 | 379.89 | 0.34 | 382.18 | 0.65 | 383.76 | 1.26 | 389.29 | 1.05 |
| Residual Mass (%) | 14.51 | 0.40 | 14.69 | 0.64 | 15.45 | 0.34 | 15.07 | 1.29 | 13.11 | 0.30 |
| Max rate of Decomp (%/° C.) | 0.01 | 0.00 | 0.01 | 0.00 | 0.01 | 0.00 | 0.01 | 0.00 | 0.01 | 0.00 |
| Max Rate of Decomp Temp (° C.) | 378.30 | 1.74 | 384.66 | 0.34 | 385.53 | 0.89 | 385.71 | 0.72 | 383.99 | 0.32 |

Density—Apparent density is the mass to volume ratio of foam, and for automotive applications is important when considering load-bearing applications and cost. It should be understood that density influences and is positively correlated to mechanical, thermal, and sound absorption properties of foams, which is a desired aspect for automotive engine covers, despite the increased cost associated with greater foam density. The apparent densities of foam samples generally increased with increasing rPA12 filler content, excluding foams with 4% rPA12 filler, which exhibited a statistically non-significant change compared to foams with 0% rPA12 filler. Density increased by 30% in foams with 29% rPA12 filler compared to unfilled foams.

Density can be manipulated by increasing or decreasing the amount of blowing agent in a given foam formulation, with increased blowing agent associated with decreased density. The adjustment of blowing agent is often done to control the cost associated with foam density, however, in the case of this study, the amount of blowing agent was constant across all foam formulations, as shown in Table 3. Taking this into account, the trend of increased density can be attributed to increased rPA12 filler content.

Compression Modulus—The compression modulus is the ratio of mechanical stress to strain when a foam is compressed and is an indication of foam stiffness by providing information on deflection under load, and therefore correlated with load bearing capability. Foams that experience low deflections under load have higher compression moduli and stiffness. The compression moduli of foam samples increased with increasing rPA12 filler content, which in turn increased by 428% in foams with 29% rPA12 filler compared to unfilled foams. The results indicate that foam stiffness and load-bearing capability increases with increasing rPA12 filler content.

As previously noted, density of tested foam samples increased with increasing rPA12 filler content. The increase in compression modulus can be partially explained the compression modulus of flexible polyurethane foam exhibiting a power-law dependence with respect to density. Also, compression modulus increases with the addition of filler even after taking into account density through means of evaluating the specific modulus, which is the ratio of compression modulus to density, as specific modulus increased with increasing filler content. Also supporting this explanation, and as stated in the morphology section, the increased frequency of cells of a decreased diameter with the introduction of rPA12 filler act as a reinforcement within the foam, aiding in the resistance of compressive forces, and thus increasing the compression modulus.

Compression Force Deflection—Compression force deflection (CFD), used to determine load-bearing capability and foam firmness, is measure of compressive stress at a given compression height or strain. For example, the compression stress of a foam block with initial height of 10.0 cm compressed to 7.5 cm would be known as the compression stress at 25% strain or 25% CFD. Stress at 25% strain (25% CFD) is associated with surface firmness, while stress at 65% strain (65% CFD) is associated with deep support, with higher values of compression stress associated with increased load-bearing capabilities and firmness, as CFD values are directly correlated to the force (weight) required to compress the foam.

The compression stress at 25% strain of foam samples generally increased with increasing rPA12 filler content, excluding foams with 29% rPA12 filler, which exhibited a statistically non-significant change compared to foams with 15% rPA12 filler. Compression stress at 25% strain increased by 124% in foams with 29% rPA12 filler compared to unfilled foams.

Furthermore, the compression stress at 50% and 65% strain of foam samples increased with increasing rPA12 filler content at both levels, which in turn increased by 209% and 300% respectively in foams with 29% rPA12 filler compared to unfilled foam. The results indicate that foam firmness and load-bearing capability increases with increasing rPA12 filler content. It should be understood that the firmness of foam, measured by CFD, can be varied independently of density, however, is dependent on morphology in regards to cell shape and structure. Heavily tied to morphology, the introduction of particulate micro-fillers has a positive correlation with the increase of 25% and 50% CFD in polyurethane foams, which agrees with the trends observed for rPA12-filled foams.

Sag Factor—The sag factor, also known as the support factor, of flexible PU foams, calculated from the ratio of 65% CFD to 25% CFD and 50% CFD to 25% CFD, is an indication of cushioning quality as it measures the relationship between surface softness and inner support, with higher values associated with a resistance to "bottoming out". In automotive applications, sag factor is important when evaluating the comfort of seating material; however, is seldom used in relation to under-hood components.

The sag factors (65%/25%) of foam samples generally increased with increasing rPA12 filler content, excluding foams with 4% rPA12 filler, which exhibited a statistically non-significant change compared to foams with 0% rPA12 filler and foams with 15% rPA12 filler, which exhibited a statistically non-significant change compared to foams with 8% rPA12 filler. Sag factor (65%/25%) increased by 79% in foams with 29% rPA12 filler compared to unfilled foams.

The sag factors (50%/25%) of foam samples generally increased with increasing rPA12 filler content, excluding foams with 4% rPA12 filler, which exhibited a statistically non-significant change compared to foams with 0% rPA12 filler and foams with 15% rPA12 filler, which exhibited a statistically non-significant change compared to foams with 8% rPA12 filler. Sag factor (50%/25%) increased by 38% in foams with 29% rPA12 filler compared to unfilled foams. The results indicate that cushioning quality increases with increasing rPA12 filler content.

Wet Compression Set—Wet compression set is the measure of permanent deformation of foam samples after compressed to 50% of original height for a prolonged period of time, a process of which is accelerated by placing samples in a humidity chamber at 55° C. and 95% relative humidity for 22 hours. Wet compression set is expressed as a percentage and calculated by taking the ratio of difference of sample height after aging, allowing for a period of recovery of 30 minutes after decompression, to the original sample height, with lower values indicating a greater ability to return to its original height and shape.

The wet compression set of foam samples generally increased with increasing rPA12 filler content, excluding foams with 15% rPA12 filler, which exhibited a statistically non-significant change compared to foams with 4% or 8% rPA12 filler and foams with 29% rPA12 filler, which exhibited a statistically non-significant change compared to foams with 8% rPA12 filler. Wet compression set increased by 40% in foams with 29% rPA12 filler compared to unfilled foams.

The results indicate that susceptibility to permanent deformation of PU foams increases with increased rPA12 content. Wet compression set is relevant to automotive applications, as vehicles are sold worldwide and exposed to extensive variety of environmental conditions; furthermore, it is important to minimize permanent deformation of foam components after vehicles are subject to such conditions. However, for automotive under-hood applications the specification of wet compression set is typically a maximum 50%, of which all tested rPA12-filled foams met this criterion.

Tensile Strength—Tensile strength is defined as the tensile stress and maximum load and was examined through measuring the stress at the point in which a dog-bone shaped foam specimen is pulled to its maximum load and has reached its breaking point. Tensile strength provides useful insight on the ability to handle foams during post-processing operations, such a demolding.

The tensile strength of foam samples exhibited a statistically non-significant change with an increase of rPA12 content, compared to foams with 0% rPA12 filler, at all levels except for foams with 8% rPA12 filler, which demonstrated a tensile strength increase of 21% compared to unfilled foams. However, foams with 8% rPA12 filler exhibited a statistically non-significant change compared to foams with 4% rPA12 filler.

Tensile strength increases with particulate micro-filler content, and then decreases once a critical concentration of filler is exceeded, due to increased difficulty of dispersion of filler in the polyurethane matrix. A similar trend is observed in the above results, in which tensile strength increased at 8% rPA12 filler content, and at 15% rPA12 content decreased to value that was a statistically non-significant change compared to unfilled foam, meaning that the addition of the filler did not adversely affect the property. Despite this, the tensile strength requirement for automotive under-hood foam components is typically a minimum of 100 kPa, a criterion that not even the control sample met. In future formulations, the concentrations of various additives can be adjusted in order to meet a degree of cross-linking density that better suits under-hood components.

Extension at Maximum Load—Extension at maximum load is the measure of distance that a dog-bone shaped foam specimen can be stretched, or elongated, prior to reaching a breaking point at which maximum load occurs. Similar to tensile strength, this property is useful for post-processing operations, such as demolding.

The extension at maximum load of foam samples exhibited a statistically non-significant change at levels of 4% and 8% filler, compared to foams with 0% rPA12 filler, and decreased at concentrations above 8% rPA12 filler. Foams with 29% rPA12 filler exhibited a statistically non-significant change compared to foams with 15% rPA12 filler. Extension at maximum load decreased by 27% in foams with 29% rPA12 filler compared to unfilled foams.

The results indicate a decrease in extension at maximum load, and thus elongation at break, in polyurethane foams that have been loaded with greater than 8% rPA12 content, which exhibits a similar critical concentration as observed in the tensile strength results. When considering the implementation of this technology in automotive applications, it may be of concern that the addition of rPA12 filler led to a decrease in this property. However, foams can be formulated with a concentration of rPA12 filler in which extension at maximum load is not affected, as observed at 8% or less filler content.

Young's Modulus—Young's modulus, also known as tensile or elastic modulus, is the initial slope of the stress strain curve and gives insight to the elastic properties of flexible polyurethane foams when subject to tensile stress.

The Young's modulus of foam samples generally increased with increasing rPA12 filler content, excluding foams with 4% rPA12 filler, which exhibited a statistically non-significant change compared to foams with 0% rPA12 filler and foams with 15% rPA12 filler, which exhibited a statistically non-significant change compared to foams with 8% rPA12 filler. Young's modulus increased by 61% in foams with 29% rPA12 filler compared to unfilled foams.

Tear Resistance—Tear resistance, also known as tear strength, is the measure of force required to tear a notched foam sample when pulled from both ends. Tear resistance is not essential for regular use unless anchored to a solid substrate. However, it is useful for post-processing operations, such as demolding.

The tear resistance of foam samples generally decreased with increasing rPA12 filler content, excluding foams with 4% rPA12 filler, which exhibited a statistically non-significant change compared to foams with 0% rPA12 filler and foams with 15% rPA12 filler, which exhibited a statistically non-significant change compared to foams with 8% rPA12 filler. Tear resistance decreased by 23% in foams with 29% rPA12 filler compared to unfilled foams. The specification of tear resistance for automotive under-hood applications is typically a minimum 0.01 N/mm, of which all tested rPA12-filled foams exceeded this criterion.

Mass Loss—Thermal stability, i.e., the resistance to decomposition at high temperatures, is an important property for automotive under-hood foam applications, as engine compartments are often subject to high temperatures for extended periods. Samples underwent thermal gravimetric analysis (TGA) to determine the effect of the rPA12 filler on thermal stability.

Figure 4:
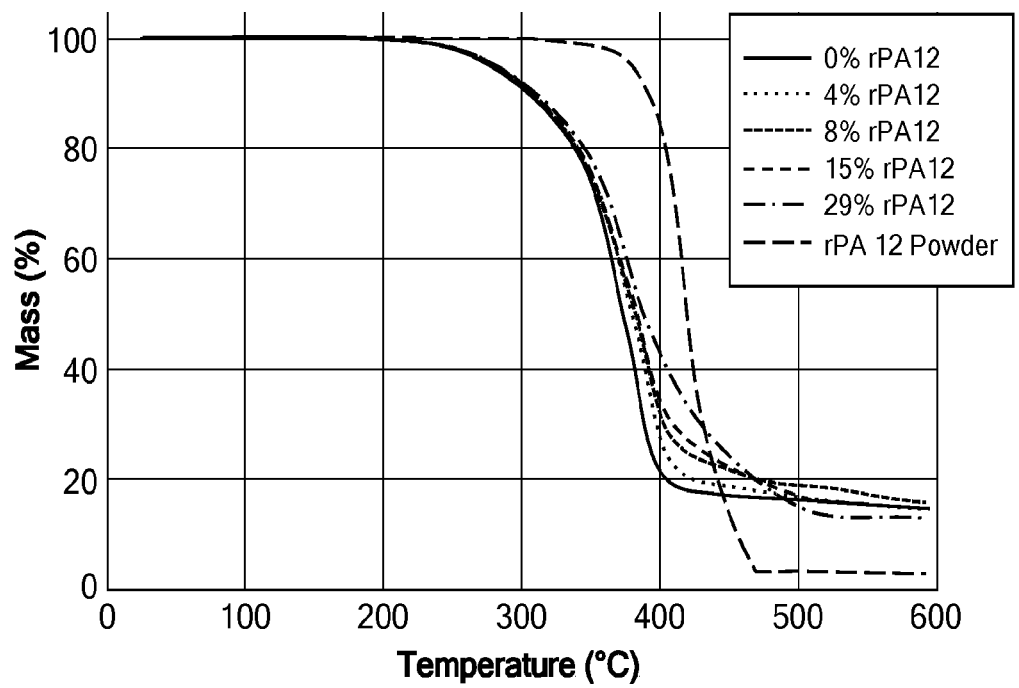
FIG. 4 is a mass loss curves (TGA) for rPA12 filler and foams with varying rPA12 content.
Figure 5:
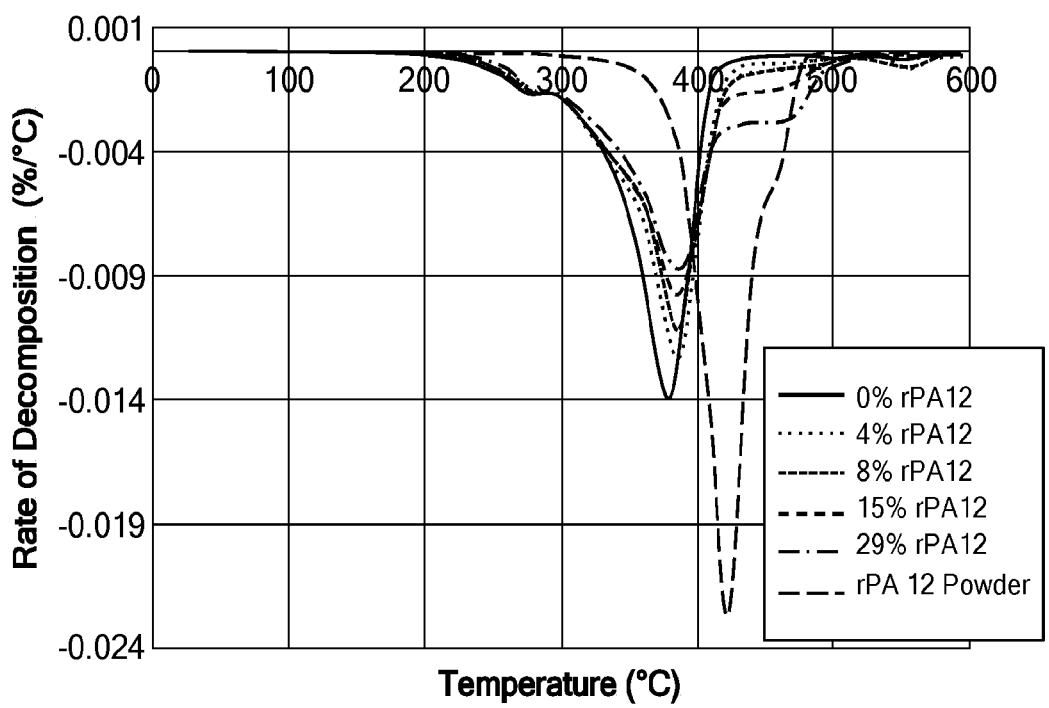
FIG. 5 is a rate of decomposition (DTG) curves for rPA12 filler and foams with varying rPA12 content.

Referring to FIGS. 4 and 5, TGA curves, which were used to locate 10% mass loss temperature, 50% was loss temperature, and residual mass (Table 6). Tukey-Kramer HSD was only performed on values associated with foam samples and not that of rPA12 filler (powder), which is presented in figures below as a comparison. Temperature at 10% mass loss, located at 90% sample mass on the TGA curve, corresponds to the first signs of thermal degradation in flexible PU foams.

The 10% mass loss temperature of foam samples exhibited a statistically non-significant change with an increase of rPA12 content at all levels, compared to foams with 0% rPA12 filler. However, rPA12 filler displayed a 27% increase in 10% mass loss temperature compared to unfilled foams, although this was not included in the Tukey-Kramer HSD groupings. The results indicate that initial resistance to thermal degradation in flexible PU foams is not impacted by the introduction of rPA12 filler.

Temperature at 50% mass loss, located at 50% sample mass on the TGA curve, corresponds to thermal stability and the resistance to thermal degradation in flexible PU foams.

The 50% mass loss temperature of foam samples generally increased with increasing rPA12 filler content, excluding foams with 8% rPA12 filler, which exhibited a statistically non-significant change compared to foams with 4% rPA12 filler and foams with 15% rPA12 filler, which exhibited a statistically non-significant change compared to foams with 8% rPA12 filler. Temperature at 50% mass loss increased by 4% in foams with 29% rPA12 filler compared to unfilled foams. However, rPA12 filler displayed a 13% increase in 50% mass loss temperature compared to unfilled foams, although this was not included in the Tukey-Kramer HSD groupings. The results indicate that thermal and resistance to thermal degradation in flexible PU foams increased with rPA12 filler content. It should be understood that the introduction of particulate fillers reduce flammability of flexible PU foam, which corresponds to thermal stability.

Residual mass, located at 600° C. chamber temperature on the TGA curve, is the remaining solid sample mass, expressed as a percentage, at the end of a TGA run.

The residual mass of foam samples exhibited a statistically non-significant change with an increase of rPA12 content at all levels, compared to foams with 0% rPA12 filler. Foams with 29% rPA12 filler exhibited a statistically significant decrease in residual mass compared to foams with 15% rPA12 filler. However, rPA12 filler displayed an 80% decrease in residual mass compared to unfilled foams, although this was not included in the Tukey-Kramer HSD groupings. The results indicate that residual mass in flexible PU foams is not impacted by the introduction of rPA12 filler.

Rate of Foam Decomposition—The first derivative of TGA mass loss curves are known as derivative thermogravimetric analysis (DTG) curves, which correspond to the rate of decomposition (mass loss) with respect to temperature.

The maximum rate of decomposition (mass loss) was found at the absolute minimum of each DTG curve, which corresponds to the inflection point of TGA mass loss curves and is associated with polyol degradation. DTG curves were further examined for local extrema, of which local minima of $-0.002\%/°$ C. were found between 282° C. to 285° C. and local maxima of $-0.002\%/°$ C. were found between 290° C. and 292° C. for foams containing 0% to 15% rPA12 filler. rPA12 filler and foams containing 29% rPA12 filler did not exhibit local extrema. These local extrema correlate to the degradation of urethane and urea linkages. Tukey-Kramer HSD was only performed on values associated with foam samples and not that of rPA12 filler (powder), which is presented in figures as a comparison.

Maximum rate of decomposition (mass loss), located at the absolute minimum of the DTG curve, corresponds to thermal stability in flexible PU foams.

The absolute value of maximum rate of decomposition (mass loss) of foam samples decreased with increasing rPA12 filler content, which in turn decreased by 37% in foams with 29% rPA12 filler compared to unfilled foams. However, rPA12 filler displayed a 62% increase in the absolute value of maximum rate of decomposition compared to unfilled foams, although this was not included in the Tukey-Kramer HSD groupings. The results indicate that the thermal stability of flexible PU foams increased with increasing rPA12 content demonstrated by the lower maximum rate of decomposition achieved with increasing rPA12 content.

Temperature at maximum rate of decomposition (mass loss), located on the DTG curve where rate of decomposition is at a minimum (most negative), relates to thermal stability in flexible PU foams.

The maximum rate of decomposition temperature of foam samples increased with the addition of rPA12 filler content. Foams with 4% to 29% rPA12 filler exhibited a statistically significant increase in the temperature at which the maximum rate of decomposition occurred compared to unfilled foams (2% increase), however, expressed no statistical change when compared to one another. rPA12 filler displayed an 11% increase in maximum rate of decomposition temperature compared to unfilled foams, although this was not included in the Tukey-Kramer HSD groupings. The results indicate that the thermal stability of flexible PU foams increased with the introduction of rPA12 filler.

Example Set 2

In an effort to embrace closed loop recycling and sustainable materials in the automotive industry, flexible polyurethane foam samples were prepared using recycled polyamide 12 (rPA12) powder, sourced from automotive rapid prototyping processes, as a filler at concentrations up to 30% dispersed in polyol blends containing $CO_2$-based and soy-based feedstock polyols. Based on life cycle analyses, use of $CO_2$ polyol technology in formulations replacing 20% of the traditional petroleum based polyol can reduce greenhouse gas production by 11-19%, and reduce the use of fossil fuel resources by 13-16%. Morphological, physical, mechanical, and thermal analyses were performed to characterize these foams' performance in relation to automotive standard formulas for use in under-hood applications.

Flexible PU foams according to the second set of examples are formed by reacting polyols, additives, and polyisocyanates in a standard, "A+B" two-part reaction. The A-side isocyanate component selected was Rubinate® 7304 provided by Hunstman International, LLC in Auburn Hills, Mich., which is a liquid blend of MDI series polyisocyanates. The B-side polyether polyol chosen as the standard, petroleum-based control polyol was Voranol® 4701 provided by Dow Chemical Co. in Midland, Mich. The sustainable polyol alternatives were Converge D351-30 (Novomer—Waltham, Mass.), a recaptured $CO_2$-based polycarbonate polyol, and Agrol Prime A-56 (BioBased Technolgies, LLC—Rogers, AR), a bio-based polyester polyol derived from soybean oil feedstock. The properties of these polyols, as provided by their respective suppliers, are given in Table 7.

TABLE 7

Physical and chemical properties of polyols used in foam formulations

| Property | Voranol 4701 | Converge D351-30 | Agrol Prime A-56 | Unit |
|---|---|---|---|---|
| Feedstock | Petroleum | $CO_2$ | Soy | |
| Polyol Type | Polyether | Polycarbonate | Polyester | |
| Functionality | 3.0 | 3.0 | 2.0 | |
| Sustainable Content | 0 | 20 | 75 | wt. % |
| Molecular weight | 4,900 | 3,000 | 2,000 | g/mol, GPC |
| OH number | 34 | 56 | 56 | mg KOH/g |
| Density | 1.02 | 1.14 | 0.99 | g/mL |
| Viscosity | 860 | 60,000 | 3,840 | cPs at 25° C. |

The filler at the focus of this set of examples was recycled PA12 powder (virgin material provided by EOS of North America, Inc.—Chanhassen, Minn.), sourced from an automotive part prototyping process. To obtain the recycled filler, the unsintered PA12 powder is collected from the excess material after a SLS manufacturing process and filtered through a 245 μm sieving screen. Properties of virgin PA12 powder are provided in Table 1 above.

Other additives were included in the B-side of the reaction for foam production, including: Lumulse POE (26) GLYC, a cell-opening reagent (Lambent Corporation—Gurnee, Ill.); Tegostab B4690, a silicone-based surfactant (Lambent Corporation—Gurne, Ill.); diethanolamine co-catalyst and cross-linker (Sigma Aldrich—St. Louis, Mo.), and amine catalysts Niax A300 and Niax A1 (Momentive Inc.—Waterford, Ky.). Deionized water was used as the blowing agent. Formulations of these additives with the $CO_2$ and soy polyols are provided in Tables 8A and 8B, respectively. The foam block mold was coated with release agent Chem-Trend PU-11331 before each foam pour to assist in de-molding.

TABLE 8A

| | | rPA12 Content (wt %) | | | | |
|---|---|---|---|---|---|---|
| | Component Type | 0% | 4% | 8% | 15% | 29% |
| Voranol 4701 | Petroleum Polyether Polyol | 75.0 | 75.0 | 75.0 | 75.0 | 75.0 |
| Converge D351-30 | $CO_2$ Polycarbonate Polyol | 25.0 | 25.0 | 25.0 | 25.0 | 25.0 |
| Lumulse POE (26) GLYC | Cell Opener | 1.0 | 1.0 | 1.0 | 1.0 | 1.0 |
| Tegostab B4690 | Surfactant | 0.5 | 0.5 | 0.5 | 0.5 | 0.5 |
| Diethanolamine (DEA) | Cross Linker | 1.5 | 1.5 | 1.5 | 1.5 | 1.5 |
| Niax A300 | Catalyst | 0.6 | 0.6 | 0.6 | 0.6 | 0.6 |
| Niax A1 | Catalyst | 0.3 | 0.3 | 0.3 | 0.3 | 0.3 |
| Deionized Water | Blowing Agent | 3.0 | 3.0 | 3.0 | 3.0 | 3.0 |
| Recycled Fine Polyamide PA 2200 (rPA12) | Filler | 0.0 | 4.1 | 8.3 | 17.8 | 39.9 |
| Rubinate 7304 | Diisocyanate (MDI) | 55.3 | 55.3 | 55.3 | 55.3 | 55.3 |

TABLE 8B

| | | rPA12 Content (wt %) | | | | |
|---|---|---|---|---|---|---|
| | Component Type | 0% | 4% | 8% | 15% | 29% |
| Voranol 4701 | Petroleum Polyether Polyol | 75.0 | 75.0 | 75.0 | 75.0 | 75.0 |
| Agrol Prime A-56 | Soy Polyester Polyol | 25.0 | 25.0 | 25.0 | 25.0 | 25.0 |
| Lumulse POE (26) GLYC | Cell Opener | 1.0 | 1.0 | 1.0 | 1.0 | 1.0 |
| Tegostab B4690 | Surfactant | 0.5 | 0.5 | 0.5 | 0.5 | 0.5 |
| Diethanolamine (DEA) | Cross Linker | 1.5 | 1.5 | 1.5 | 1.5 | 1.5 |
| Niax A300 | Catalyst | 0.6 | 0.6 | 0.6 | 0.6 | 0.6 |
| Niax A1 | Catalyst | 0.3 | 0.3 | 0.3 | 0.3 | 0.3 |
| Deionized Water | Blowing Agent | 3.0 | 3.0 | 3.0 | 3.0 | 3.0 |

TABLE 8B-continued

| | | rPA12 Content (wt %) | | | | |
|---|---|---|---|---|---|---|
| | Component Type | 0% | 4% | 8% | 15% | 29% |
| Recycled Fine Polyamide PA 2200 (rPA12) | Filler | 0.0 | 4.1 | 8.3 | 17.8 | 39.9 |
| Rubinate 7304 | Diisocyanate (MDI) | 55.1 | 55.1 | 55.1 | 55.1 | 55.1 |

All preparation of the A- and B-side components were conducted under a laboratory fume hood, including the one-step reaction. The mold was first preheated to 65° C. for 15 minutes and coated with the release agent, which was allowed to dry. The filler material, selected polyol components, and additives were measured into an inert container. Each of the sustainable polyols replaced 25% of the standard petroleum polyol formulation, resulting in two sets of foams that were made from 75% petroleum polyol with 25% $CO_2$-based polyol and 75% petroleum polyol with 25% soy-based polyol. Preliminary results showed that 25% sustainable polyol in the formulation provided best mechanical and physical properties. In the following sections, these two separate sets are referred to as "$CO_2$ foams" and "soy foams", or variations thereof.

Filled foams were prepared by adding rPA12 powder to the polyol mixture at levels of 4%, 8%, 15%, and 29% (total wt. % of rPA12 in polyol-filler blend). With both the 25% $CO_2$ and 25% soy polyol blend formulations, a sample containing 0% rPA12 filler was made to capture any variations in ambient lab humidity, temperature, or other conditions, serving as a control sample. Filler particles were dispersed into the blend slowly, to reduce the chance of the powder becoming airborne and escaping the mixture, and then the entire container was homogenized by means of a standard lab-scale hand-mixing apparatus at 1500 RPM. After three minutes of blending, the specified mass of isocyanate was then added in the reaction step, and mixed for an additional 12 seconds. This mixture was immediately poured into the mold, and given 6 minutes to cure. After removing foam blocks from the mold, trapped gasses were released by hand through repetitive application of compressive force. The resulting foam blocks measured 30.5×30.5× 5.1 cm³. In the final step of curing, each foam block was allowed to sit in a preheated oven at 65° C. for 30 minutes, and then rested at room temperature for an additional 12 hours.

The foam samples were cut to comply with the standard testing parameters of the equipment used to obtain physical, mechanical, and thermal properties. Each foam block was first cut into the heights of the testing dimensions with a band saw, and then, when required, stamped into their final testing shapes with a USM Hytronic Model B press. When obtaining mechanical properties of each foam formulation, the tested samples were randomly selected in sets of six. Tensile, tear, and compression tests were conducted using an Instron 3366 apparatus. Selected foam properties were obtained according to the standards outlined in Table 4 above.

Mass loss in response to temperature change was measured to examine foam thermal properties, through the use of thermogravimetric analysis (TGA) and derivative thermogravimetric analysis (DTG) on a Mettler Toledo TGA/ DCS 1, with Stare software. The chamber cycled from 25° C. to 600° C. under nitrogen gas applied at 30 mL/min, and any change in sample mass was measured. Three samples of approximately 10 mg initial mass were selected from each foam formulation.

Data comparisons of all foam properties were made relative to that sustainable polyol's control formulation. Any percent changes are meant to represent internal differences in the mean within either the $CO_2$- or soy-based polyols, but not between those two separate sets. Microscopy of foam samples was performed on a Keyence VHX digital microscope at 200× magnification to categorize morphology (cell shape and size).

Physical, tensile, compressive, and thermal properties of flexible polyurethane foams made with $CO_2$ or soy-polyol and filled with rPA12 at levels of 0%, 4%, 8%, 15%, and 29% were compared using a one-way analysis of variance (ANOVA) followed by Tukey-Kramer honest significant difference (HSD) test at $\alpha=0.05$ with Minitab 17 Statistical Software. The results for the flexible polyurethane foams made with $CO_2$ or soy-polyol reactants are provided in Tables 9A and 9B, respectively.

TABLE 9A

| | Property | rPA12 Content (wt %) | | | | | | | | |
|---|---|---|---|---|---|---|---|---|---|---|
| | | 0% | | 4% | | 8% | | 15% | | 29% |
| Compression | Density (kg/m3) | B | | B | (NC) | AB | (NC) | A | (+20%) | A | (+25%) |
| | Compression Modulus (MPa) | C | | C | (NC) | B | (+36%) | B | (+43%) | A | (+134%) |
| | Stress at 25% Strain (kPa) | A | | B | (−18%) | A | (NC) | A | (NC) | A | (NC) |
| | Stress at 50% Strain (kPa) | C | | D | (−16%) | B | (+35%) | BC | (NC) | A | (+41%) |
| | Stress at 65% Strain (kPa) | C | | C | (NC) | B | (+26%) | B | (+25%) | A | (+75%) |
| | SAG Factor (65%/25%) | D | | CD | (NC) | BC | (+15%) | BC | (+19%) | A | (+57%) |
| | SAG Factor (50%/25%) | C | | BC | (NC) | BC | (NC) | B | (+9%) | A | (+26%) |
| | Wet Compression Set (%) | B | | B | (NC) | B | (NC) | B | (NC) | A | (+29%) |
| Tensile | Tensile Strength (kPa) | B | | B | (NC) | A | (+23%) | C | (−20%) | C | (−22%) |
| | Extension at Max Load (mm) | AB | | A | (NC) | AB | (NC) | BC | (NC) | C | (−23%) |
| | Young's Modulus (MPa) | BC | | BC | (NC) | A | (+27%) | C | (NC) | AB | (NC) |
| | Tear Resistance (N/mm) | B | | A | (+31%) | A | (+27%) | A | (+27%) | B | (NC) |
| Thermal | 10% Mass Loss Temp (° C.) | C | | BC | (NC) | ABC | (NC) | AB | (+3%) | A | (+4%) |
| | 50% Mass Loss Temp (° C.) | D | | C | (+1%) | C | (+2%) | B | (+3%) | A | (+4%) |

TABLE 9A-continued

| | | rPA12 Content (wt %) | | | | | | | | |
|---|---|---|---|---|---|---|---|---|---|---|
| Property | 0% | 4% | | 8% | | 15% | | 29% | |
| Residual Mass (%) | AB | A | (NC) | A | (NC) | A | (NC) | B | (NC) |
| Max Rate of Decomp (%/° C.) | A | B | (−16%) | B | (−20%) | C | (−30%) | D | (−38%) |
| Max Rate of Decomp Temp (° C.) | B | A | (+1%) | A | (+1%) | A | (+2%) | B | (NC) |

TABLE 9B

| | | | rPA12 Content (wt %) | | | | | | | | |
|---|---|---|---|---|---|---|---|---|---|---|---|
| | Property | 0% | 4% | | 8% | | 15% | | 29% | |
| | Density (kg/m3) | C | C | (NC) | B | (+10%) | B | (+9%) | A | (+33%) |
| Compression | Compression Modulus (MPa) | C | C | (NC) | B | (+94%) | B | (+99%) | A | (+324%) |
| | Stress at 25% Strain (kPa) | D | C | (+30%) | BC | (+42%) | B | (+53%) | A | (+160%) |
| | Stress at 50% Strain (kPa) | D | C | (+30%) | B | (+58%) | B | (+69%) | A | (+217%) |
| | Stress at 65% Strain (kPa) | D | C | (+30%) | B | (+75%) | B | (+84%) | A | (+267%) |
| | SAG Factor (65%/25%) | C | C | (NC) | B | (+24%) | B | (+21%) | A | (+41%) |
| | SAG Factor (50%/25%) | C | C | (NC) | B | (+11%) | B | (+11%) | A | (+22%) |
| | Wet Compression Set (%) | B | AB | (NC) | AB | (NC) | B | (NC) | A | (+18%) |
| Tensile | Tensile Strength (kPa) | BC | A | (+27%) | BC | (NC) | B | (NC) | C | (NC) |
| | Extension at Max Load (mm) | AB | A | (NC) | B | (NC) | B | (NC) | C | (−34%) |
| | Young's Modulus (MPa) | D | B | (+26%) | CD | (NC) | BC | (+25%) | A | (+72%) |
| | Tear Resistance (N/mm) | A | BC | (−27%) | B | (−21%) | CD | (−30%) | D | (−36%) |
| Thermal | 10% Mass Loss Temp (° C.) | D | CD | (NC) | BC | (+3%) | AB | (+5%) | A | (+7%) |
| | 50% Mass Loss Temp (° C.) | C | BC | (NC) | BC | (NC) | B | (+1%) | A | (+2%) |
| | Residual Mass (%) | A | A | (NC) | AB | (NC) | B | (−15%) | C | (−28%) |
| | Max Rate of Decomp (%/° C.) | A | B | (−5%) | B | (−8%) | C | (−15%) | D | (−29%) |
| | Max Rate of Decomp Temp (° C.) | AB | A | (NC) | AB | (NC) | BC | (NC) | C | (−1%) |

In the tables, means within a given property that do not share a letter indicate a statistically significant difference. "NC" is no significant change on the addition of rPA12 at the given level compared to samples with 0% rPA12 ($\alpha=0.05$) and parentheses show the effect of rPA12 loading on the physical, mechanical, and thermal properties of filled foams in comparison to unfilled foam (0% rPA12).

One of the essential properties of a foam sample is the shape, structure, size and distribution of its cells, also known as its morphology. The details found by examining these foams in this microscopic fashion play a key factor in determining and explaining trends in other properties of flexible polyurethane foams. For example, uniform and well distributed small cells can have structural implications, acting as a reinforcement within polyurethane foams by offering increased regions of concentrated bulk material. This makes foams more resistive to tensile and compressive stress and increases sound absorption efficiency, which is a desired property for foam automotive engine covers.

Figure 6A:
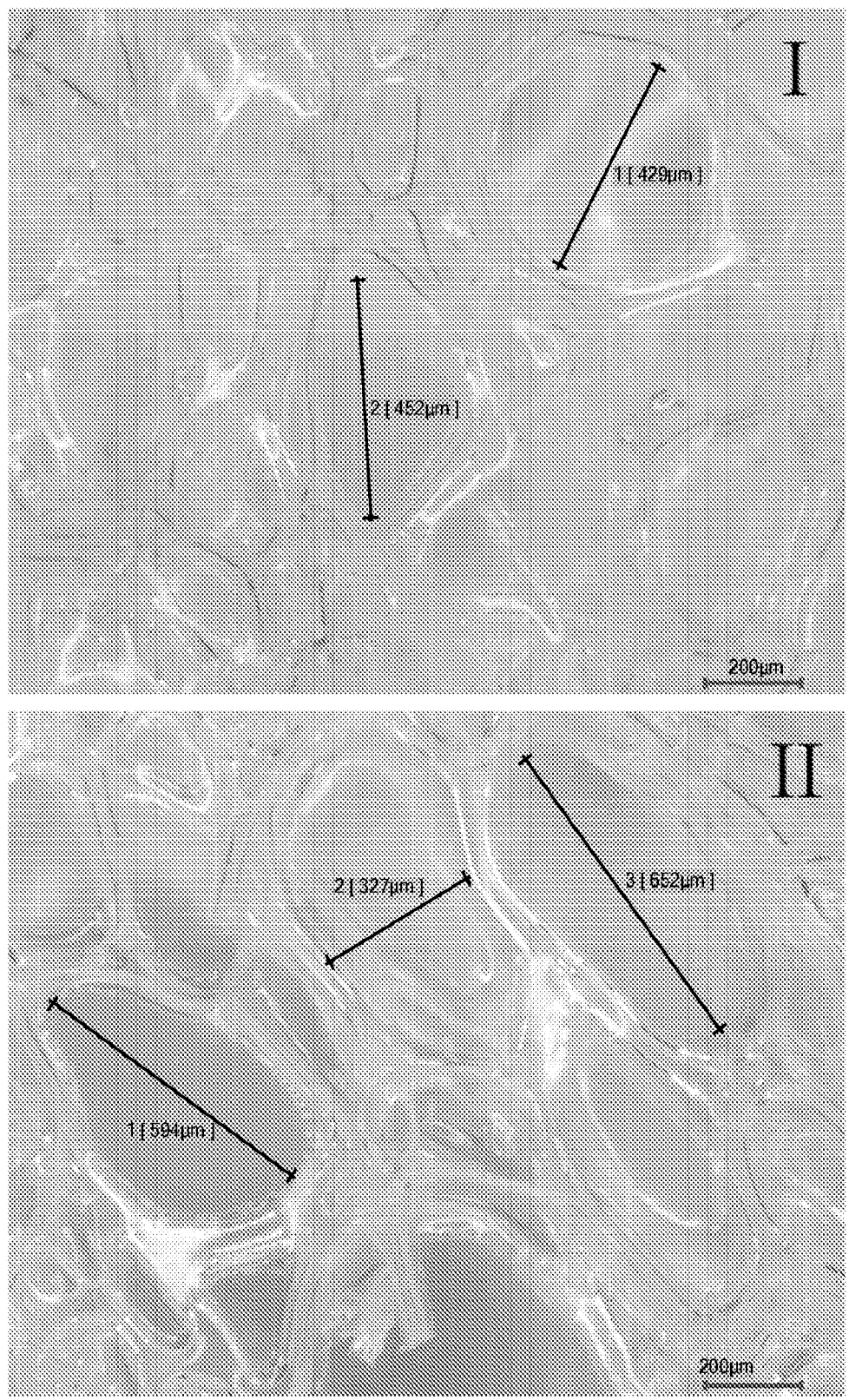
FIG. 6A is a microscopy image of control (I) $CO_2$ and (II) soy foam samples (0% rPA12 filler)
Figure 6B:
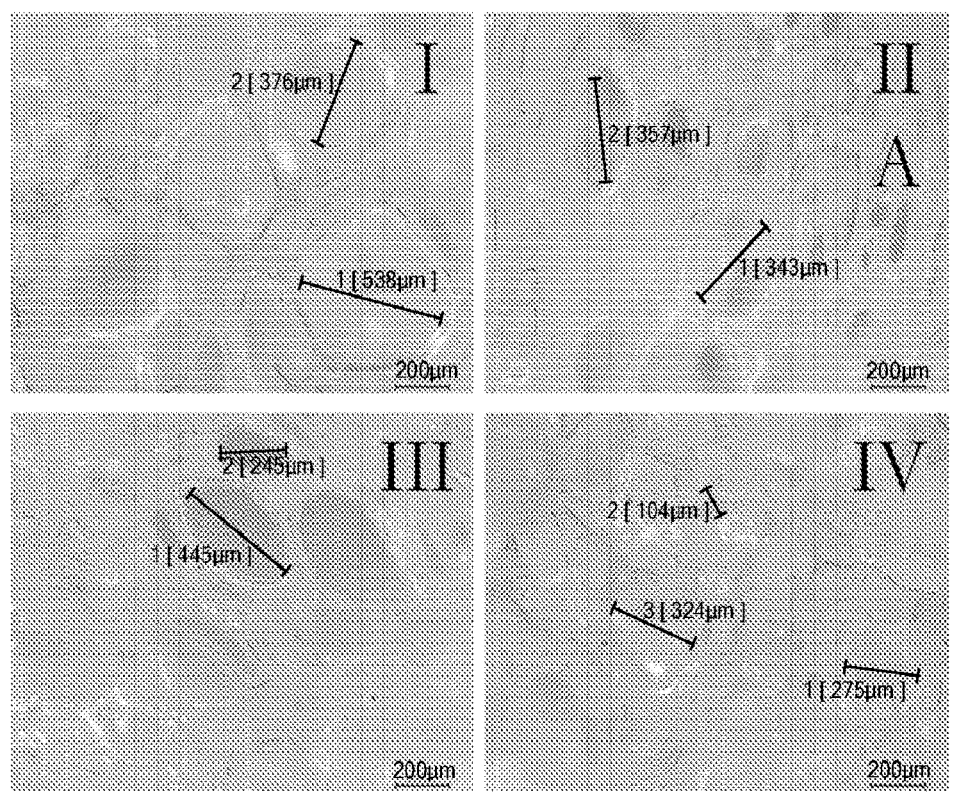
FIG. 6B is microscopy images of $CO_2$ foam samples containing (I) 4% (II) 8%, (III) 15%, and (IV) 29% rPA12 filler.
Figure 6C:
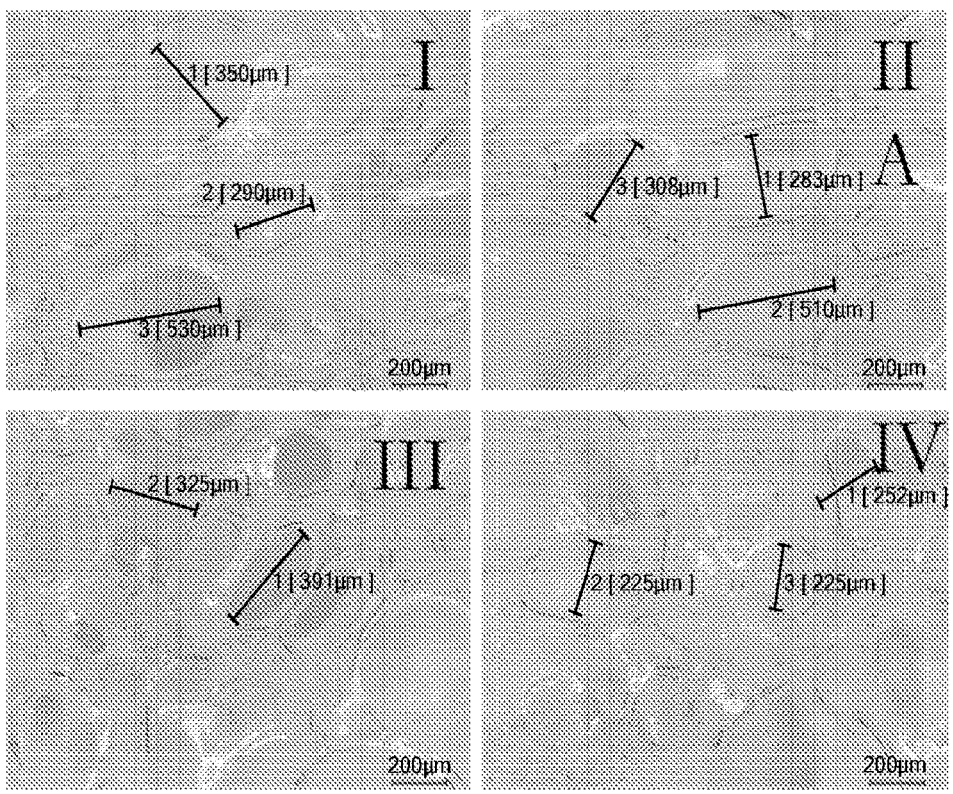
FIG. 6C is microscopy images of soy foam samples containing (I) 4% (II) 8%, (III) 15%, and (IV) 29% rPA12 filler.

Referring to FIG. 6A, microscopy images of unfilled $CO_2$ and soy foams, henceforth referred to as the "control" for their respective $CO_2$ or soy foam sample sets, are provided. After synthesizing the $CO_2$ and soy foam samples with rPA12 filler, each formulation was examined at 200× magnification. Images of rPA12-filled foams for the $CO_2$-based polyol formulations are shown in FIG. 6B, and images of rPA12-filled foams for the soy-based polyol formulations are shown in FIG. 6C. These images were analyzed and compared to determine the effect of the rPA12 filler on cell size and structure.

The images presented in FIGS. 6A, 6B, and 6C were selected as being representative of the entire foam sample set at that level of rPA12 filler, and were chosen to convey trends seen while analyzing a greater population of these foams in microscopic detail. Due to the overall variation in uniformity within even a single sample, however, concrete numbers will not be given in this analysis, but lessons learned about the general morphology will be conveyed.

As the concentration of rPA12 filler in both the $CO_2$ and soy foam samples increased, it was observed that cell size generally decreased. Additionally, cell matrix uniformity and cell network density increased with higher levels of rPA12 filler. In $CO_2$ foams with 8%, 15% and 29% rPA12 filler, a higher frequency of cell sizes below 500 μm were observed compared to foams with 0% and 4% rPA12 filler. FIGS. 23A-I and 23B-I show selected measurements of the larger cell sizes (>500 μm), which were absent from foam samples containing higher levels of filler. In the soy foams sample set, the same trend was seen, with the 15% and 29% rPA12 filler foams showing a significantly lower frequency of these greater than 500 μm cell diameters. These larger cell sizes can be found in the selected measurements displayed in FIGS. 6A-II, 6C-I and 6C-II.

The relationship of decreasing cell size and increasing uniformity associated with the addition of rPA12 filler has been highlighted in other experiments, some of which postulated that the use and concentration of fillers in polyurethane foams correlates to an increased frequency of fine cells. However, in the case of optical microscopy, there are some disclaimers. As mentioned before, foam samples made on a laboratory scale are often non-homogenous, and cell geometry can be unique to each block. Thus the relationship of cell size versus treatment is empirical, and the results may be influenced by an unintended sampling bias when scanning these foam surfaces. Still, the lessons learned through this morphological analysis of open cell size, distribution, and uniformity are valuable in the explanations below in terms of physical, mechanical, and thermal properties relating to rPA12 filler.

Tables 12A and 12B below show the average values (Ave.) and standard deviation ($\sigma$) for the properties listed above in Tables 11A and 11B, respectively, for the flexible polyurethane foams made with $CO_2$-based feedstock polyol and soy-based feedstock polyol, respectively, filled with rPA12 at levels of 0%, 4%, 8%, 15%, and 29%. The various properties in the tables are discussed below.

TABLE 12A

| | % of Filler | | | | | | | | | |
|---|---|---|---|---|---|---|---|---|---|---|
| | 0% | | 4% | | 8% | | 15% | | 29% | |
| Property | Ave. | σ | Ave. | σ | Ave. | σ | Ave. | σ | Ave. | σ |
| Density | 43.90 | 0.65 | 44.32 | 0.74 | 46.81 | 0.79 | 50.06 | 2.04 | 56.97 | 2.09 |
| Compression Modulus (MPa) | 0.07 | 0.00 | 0.06 | 0.01 | 0.10 | 0.00 | 0.10 | 0.01 | 0.16 | 0.02 |
| 25% CFD (kPa) | 4.86 | 0.66 | 3.99 | 0.45 | 5.27 | 0.49 | 5.08 | 0.44 | 5.38 | 0.42 |
| 50% CFD (kPa) | 8.23 | 0.76 | 6.91 | 0.62 | 9.70 | 0.77 | 9.40 | 0.61 | 11.58 | 0.89 |
| 65% CFD (kPa) | 14.25 | 1.12 | 12.03 | 1.15 | 17.90 | 1.36 | 17.87 | 1.17 | 24.92 | 1.71 |
| SAG Factor 65%25% | 2.96 | 0.29 | 3.02 | 0.17 | 3.41 | 0.19 | 3.53 | 0.15 | 4.64 | 0.33 |
| Wet Compression Set (%) | 30.46 | 2.65 | 31.81 | 3.03 | 29.89 | 2.30 | 32.90 | 2.66 | 39.31 | 2.14 |
| Tensile Strength at Max Load (kPa) | 118.87 | 10.41 | 127.17 | 13.75 | 76.55 | 19.26 | 95.67 | 6.94 | 93.18 | 7.80 |
| Extension at Max Load (mm) | 90.71 | 6.22 | 96.27 | 10.91 | 77.24 | 10.82 | 79.88 | 4.81 | 69.74 | 5.57 |
| Young's Modulus (MPa) | 0.23 | 0.02 | 0.24 | 0.04 | 0.16 | 0.04 | 0.21 | 0.02 | 0.25 | 0.02 |
| Tear Resistance (N/mm) | 0.49 | 0.04 | 0.64 | 0.04 | 0.49 | 0.04 | 0.62 | 0.04 | 0.50 | 0.04 |
| 10% Mass Loss Temp (° C.) | 280.96 | 3.52 | 285.66 | 2.22 | 287.02 | 2.14 | 289.36 | 1.76 | 293.58 | 2.93 |
| 50% Mass Loss Temp (° C.) | 371.16 | 1.28 | 375.74 | 0.79 | 377.74 | 0.80 | 381.21 | 0.59 | 384.85 | 1.40 |
| Residual Mass (%) | 14.34 | 0.49 | 15.03 | 0.39 | 15.27 | 0.40 | 15.19 | 0.48 | 13.36 | 0.28 |
| Max rate of Decomp (%/° C.) | 0.01 | 0.00 | 0.01 | 0.00 | 0.01 | 0.00 | 0.01 | 0.00 | 0.01 | 0.00 |
| Max Rate of Decomp Temp (° C.) | 378.67 | 1.84 | 383.82 | 0.45 | 384.32 | 0.96 | 384.95 | 0.16 | 380.15 | 0.45 |

TABLE 12B

| | % of Filler | | | | | | | | | |
|---|---|---|---|---|---|---|---|---|---|---|
| | 0% | | 4% | | 8% | | 15% | | 29% | |
| Property | Ave. | σ | Ave. | σ | Ave. | σ | Ave. | σ | Ave. | σ |
| Density | 43.96 | 3.29 | 44.42 | 0.71 | 48.34 | 1.44 | 48.13 | 1.14 | 58.32 | 2.20 |
| Compression Modulus (MPa) | 0.06 | 0.00 | 0.08 | 0.01 | 0.12 | 0.01 | 0.13 | 0.00 | 0.27 | 0.02 |
| 25% CFD (kPa) | 4.06 | 0.31 | 5.29 | 0.52 | 5.75 | 0.33 | 6.21 | 0.66 | 10.58 | 0.46 |
| 50% CFD (kPa) | 6.71 | 0.43 | 8.74 | 0.75 | 10.59 | 0.66 | 11.31 | 0.72 | 21.27 | 0.77 |
| 65% CFD (kPa) | 11.94 | 0.74 | 15.48 | 1.28 | 20.93 | 1.68 | 21.97 | 0.91 | 43.86 | 1.63 |
| SAG Factor 65%25% | 2.94 | 0.15 | 2.94 | 0.21 | 3.64 | 0.23 | 3.57 | 0.31 | 4.15 | 0.20 |
| Wet Compression Set (%) | 33.01 | 1.78 | 35.42 | 0.98 | 35.63 | 1.63 | 34.65 | 3.79 | 39.05 | 1.81 |
| Tensile Strength at Max Load (kPa) | 84.68 | 10.60 | 107.77 | 9.06 | 84.15 | 6.13 | 91.88 | 6.20 | 78.12 | 3.90 |

TABLE 12B-continued

| | % of Filler | | | | | | | | | |
|---|---|---|---|---|---|---|---|---|---|---|
| | 0% | | 4% | | 8% | | 15% | | 29% | |
| Property | Ave. | σ | Ave. | σ | Ave. | σ | Ave. | σ | Ave. | σ |
| Extension at Max Load (mm) | 72.52 | 6.60 | 79.46 | 5.59 | 68.35 | 6.17 | 69.18 | 4.74 | 47.93 | 2.40 |
| Young's Modulus (MPa) | 0.22 | 0.02 | 0.27 | 0.02 | 0.24 | 0.02 | 0.27 | 0.02 | 0.37 | 0.03 |
| Tear Resistance (N/mm) | 0.65 | 0.01 | 0.47 | 0.04 | 0.51 | 0.03 | 0.45 | 0.02 | 0.42 | 0.01 |
| 10% Mass Loss Temp (° C.) | 291.65 | 3.78 | 297.43 | 1.06 | 301.28 | 2.07 | 306.12 | 2.42 | 311.36 | 0.80 |
| 50% Mass Loss Temp (° C.) | 396.44 | 0.55 | 398.80 | 0.77 | 398.81 | 0.07 | 399.63 | 1.61 | 404.22 | 0.76 |
| Residual Mass (%) | 16.29 | 0.67 | 15.94 | 0.53 | 15.18 | 0.69 | 13.88 | 0.48 | 11.73 | 0.17 |
| Max rate of Decomp (%/° C.) | 0.01 | 0.00 | 0.01 | 0.00 | 0.01 | 0.00 | 0.01 | 0.00 | 0.01 | 0.00 |
| Max Rate of Decomp Temp (° C.) | 399.46 | 0.24 | 400.59 | 0.90 | 399.20 | 0.26 | 397.28 | 1.64 | 394.84 | 0.80 |

Density—The apparent densities of foam samples using both polyols generally increased with increasing rPA12 filler content, excluding $CO_2$-polyol foams with 4% and 8% rPA12 filler and soy-polyol foams with 4% rPA12 filler, which exhibited a statistically non-significant change compared to their respective control foams with 0% rPA12 filler. In foams with 29% rPA12 filler content, density increased by 25% and 33% for $CO_2$ and soy foams respectively, compared to unfilled foams.

Increasing the amount of blowing agent in a foam formulation yields a decrease in foam density. However, as shown in Table 8, the amount of blowing agent remained constant across all foam formulations in this set of examples. With this in mind, the trend of increased density can be attributed to increased rPA12 filler content.

Compression Modulus—The compression moduli of foam samples generally increased with increasing rPA12 filler content, except for the 4% filler samples in both sets, which showed no statistically significant change compared to their respective control samples. In foams with 29% rPA12 filler content, compression modulus increased by 134% and 324% for $CO_2$ and soy foams respectively, compared to unfilled foams. The results indicate that foam stiffness and load-bearing capability increases with increasing rPA12 filler content.

Compression Force Deflection—The 25% compression force deflection (CFD) of soy foam samples generally increased with increasing rPA12 filler content, in which soy foams containing 29% rPA12 filler possessed a 160% higher compressive force response than the unfilled soy control. The $CO_2$ polyol samples exhibited a statistically non-significant change for all levels of rPA12 filler except for the 4% rPA12 samples, which showed an 18% decrease in 25% CFD compared to the unfilled $CO_2$ control.

The relationship between rPA12 loading and compressive force response was clearly defined at higher levels of deflection. The 50% and 65% CFD values of foam samples generally increased with increasing concentrations of rPA12 filler. In foams with 29% rPA12 filler content, 50% CFD increased by 41% and 217%, and 65% CFD increased by 75% and 267%, for $CO_2$ and soy foams respectively, compared to unfilled foams. Due to soy polyols being polyester based and $CO_2$ polyols being polycarbonate based, it is believed there may be differences in compatibility with the rPA12 filler, which in turn could affect the response to filler loading in a given property, such as compression force deflection. The collective trends from the results indicate that foam firmness and load-bearing capability increases with increasing rPA12 filler content.

Sag Factors—The 65%/25% sag factors of foam samples generally increased with increasing rPA12 filler content. In foams with 29% rPA12 filler content, 65%/25% sag factor increased by 57% and 41% for $CO_2$ and soy foams respectively, compared to unfilled foams.

The 50%/25% sag factors of foam samples generally increased with increasing rPA12 filler content, excluding $CO_2$ foams with 4% and 8% rPA12 filler, which exhibited a statistically non-significant change compared to the unfilled $CO_2$ control sample and soy foams with 4% rPA12 filler, which exhibited a statistically non-significant change compared to the unfilled soy control sample. In foams with 29% rPA12 filler content, 50%/25% sag factor increased by 26% and 22% for $CO_2$ and soy foams respectively, compared to unfilled foams. The trends from these results indicate that cushioning quality increases with increasing rPA12 filler content, which corroborates previous research that has shown that sag factor increases with density and filler content.

Wet Compression Set—The wet compression set showed only a statistically significant difference in both $CO_2$ and soy foams with 29% rPA12 filler, which increased by 29% and 18%, respectively, over the control samples. Lower levels of filler showed a statistically non-significant change compared to the unfilled control samples.

The data indicate that above a certain level of rPA12 loading—between 15% and 29% filler content—rPA12 filled foams become increasingly susceptible to permanent deformation with increased rPA12 filler content. One of the challenges associated with manufacturing and selling automotive vehicles globally is the diversity of conditions in which vehicles operation occurs, and so it is important to make sure every vehicle component can stand up to environmental extremes before moving forward with their implementation. Vehicles are becoming more robust, with greater impetus to select durable materials that resist permanent deformation under long-term stress. It should be noted that for automotive under-hood applications, the specification of wet compression set is typically a maximum 50%, and all tested rPA12-filled $CO_2$ and soy foams met this criterion.

Tensile Strength—In the $CO_2$ foam samples, the peak tensile strength at max load was found in foams with 8% rPA12 filler, with a 23% increase over the control sample. Higher levels of rPA12 filler led to a decrease in tensile strength, with the 29% rPA12 filler samples registering a 22% lower tensile stress at max load compared to the unfilled control. In the soy foam samples, the peak tensile strength at max load was found in foams with 4% rPA12 filler, with a 27% increase over the control sample. Higher levels of rPA12 filler did not increase the measured ultimate tensile strength any further, with all other levels of rPA12 filler exhibiting a statistically non-significant change compared to the soy foam control.

Extension at Maximum Load—Tables 12A and 12B show a decrease in extension at maximum load, and thus elongation at break, in polyurethane foams above a critical concentration (between 15% and 29%) of rPA12 filler content. As highlighted previously, this is another tensile property which carries more importance during the post-processing operations undertaken to de-mold and transport the foams, and not during the majority of foam applications' typical uses. Therefore, when considering potential automotive uses, it should be only a minor concern that this property decreased at levels above 15% rPA12 filler.

Young's Modulus—The Young's modulus results showed only a statistically significant difference in $CO_2$ foams with 8% rPA12 filler, which increased by 27% over the control samples. The Young's modulus of soy foam samples generally increased with increasing rPA12 filler content, in which soy foams containing 29% rPA12 filler possessed a 72% greater Young's modulus than the unfilled soy control. It should be understood that Young's modulus increases with both density and particulate filler content non-linearly and agrees with the density results obtained from both sustainable polyol foams, and with the Young's modulus trends observed in increasing levels of rPA12 loading in the soy foam samples.

Tear Resistance—In the $CO_2$ foam samples, the 4%, 8%, and 15% levels of filler all showed similar increased values of tear resistance, and the 29% rPA12 filler sample did not give a statistically significant change from the control sample. The largest change was found in the 4% filler level, increasing by 31%. In the soy foam samples, increasing filler content was generally associated with a decrease in tear resistance. The largest change from the control sample was found in the 29% rPA12 samples, which decreased by 36%.

While the $CO_2$ samples do not indicate clear trends between tear resistance and rPA12 filler content, the results of the soy foam samples did indicate such a trend. For the automotive industry, one general specification for the necessary tear resistance of under-hood applications sets the threshold at 0.01 N/mm. This requirement was attained and exceeded by all rPA12 filled foam samples, both in the $CO_2$ and soy formulations.

Figure 7A:
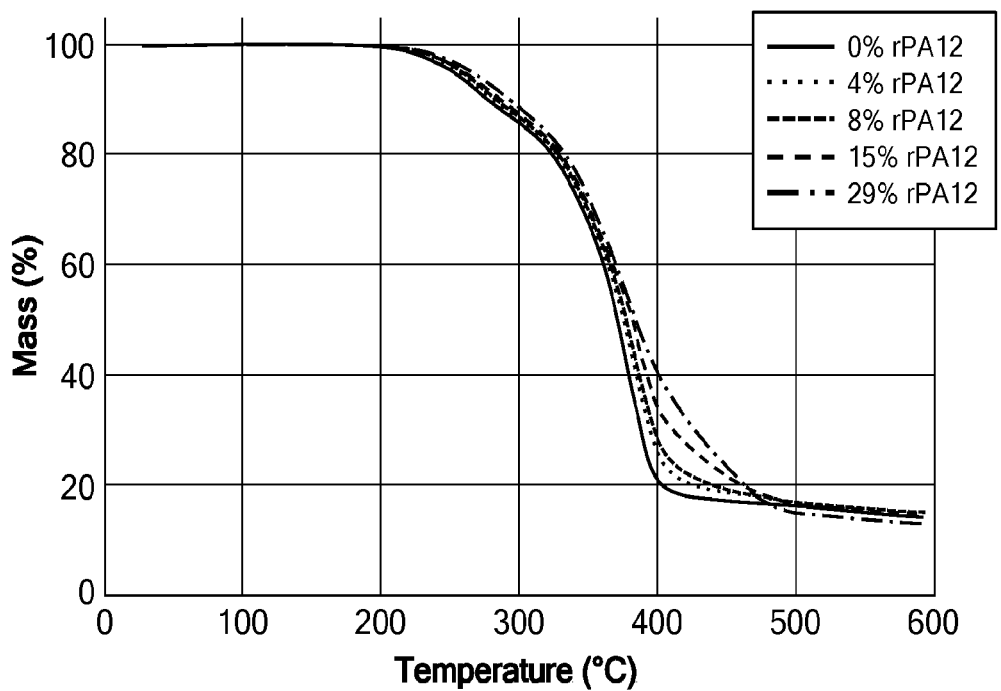
FIG. 7A is mass loss curves (TGA) for rPA12 filler and $CO_2$ foams with 0 to 29% rPA12 filler.
Figure 7B:
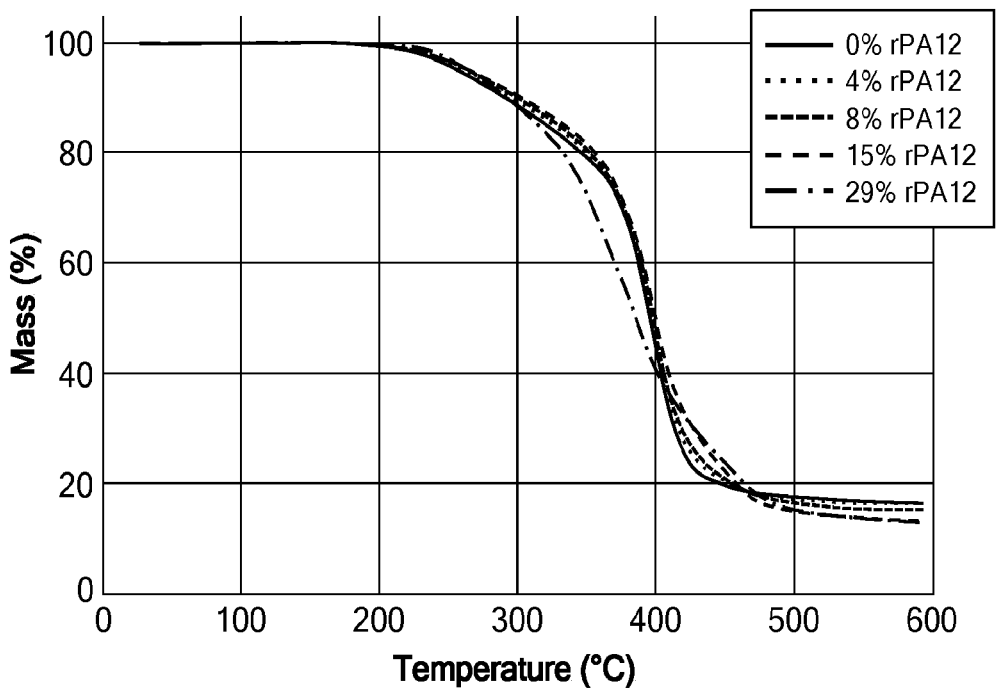
FIG. 7B is mass loss curves (TGA) for rPA12 filler and soy foams with 0 to 29% rPA12 filler.

Mass Loss—Referring to FIGS. 7A and 7B, mass loss (TGA) curves over the specified temperature range for rPA12 filler, $CO_2$ based foams, soy based foams, and their control samples are shown. The 10% and 50% mass loss temperatures, as well as the samples' residual mass, were obtained from the TGA curves. Temperature at 10% mass loss corresponds to the first signs of thermal degradation in flexible PU foams. For the $CO_2$ foams, while the means of the foam samples steadily increased with increasing rPA12 content, only the 15% and 29% levels of filler showed a statistically significant change, increasing 3% and 4%, respectively. The soy foams showed a similar trend. The means of the soy foam samples increased with increasing rPA12 content, but the 4% rPA12 filler samples did not show a statistically significant change. The soy foams with 8%, 15%, and 29% levels of filler showed an increase of 3%, 5%, and 7%, respectively. The results indicate that initial resistance to thermal degradation in flexible PU foams was impacted by the introduction of rPA12 powder, increasing with higher levels of the filler.

Temperature at 50% mass loss corresponds to thermal stability and the resistance to thermal degradation in flexible PU foams. The mean temperatures for 50% mass loss temperature for both the $CO_2$ and soy samples appeared to generally increase with higher concentrations of rPA12 filler. In the $CO_2$ foam samples, all levels of filler showed a statistically significant increase, with the largest change found in the 29% filler level, increasing 4% over the unfilled control. In the soy foam samples, the Tukey-Kramer comparisons showed that only the 15% and 29% filler levels showed a statistically significant change, increasing by 1% and 2% over the unfilled control, respectively. The trends shown here indicate that resistance to thermal degradation, corresponding to thermal stability in flexible PU foams, increased with rPA12 filler content.

Residual Mass—Due to the standard deviations and distribution of the means for the data set, the $CO_2$ foam samples did not show a statistically significant change compared to the unfilled control sample, shown in the Tukey-Kramer comparisons in Table 10A. The soy foam samples with levels of 4% and 8% filler also did not show a statistically significant change compared to their control samples. The 15% and 29% rPA12 filled soy foams showed a significant decrease in residual mass, decreasing by 15% and 28%, respectively, over the residual mass of the unfilled control soy sample.

While the trends for residual mass with increasing rPA12 content varied between the two sample sets of $CO_2$ and soy foams, the lowest means for both sets were found at the 29% filler level. When collectively examining these results with the trends of the 10% and 50% mass loss results, it can be concluded that while the incorporated rPA12 material may provide initial resistance to thermal degradation, the temperature required to fully degrade raw rPA12 may be higher than 600° C. This would mean the material is still losing mass as the test concludes, and so the residual mass would be lower at higher temperatures with more of the rPA12 material. Still, while testing up to 600° C. is useful for investigating thermal properties, the final foam product will likely never see temperatures of such magnitude while in normal operation.

Figure 8A:
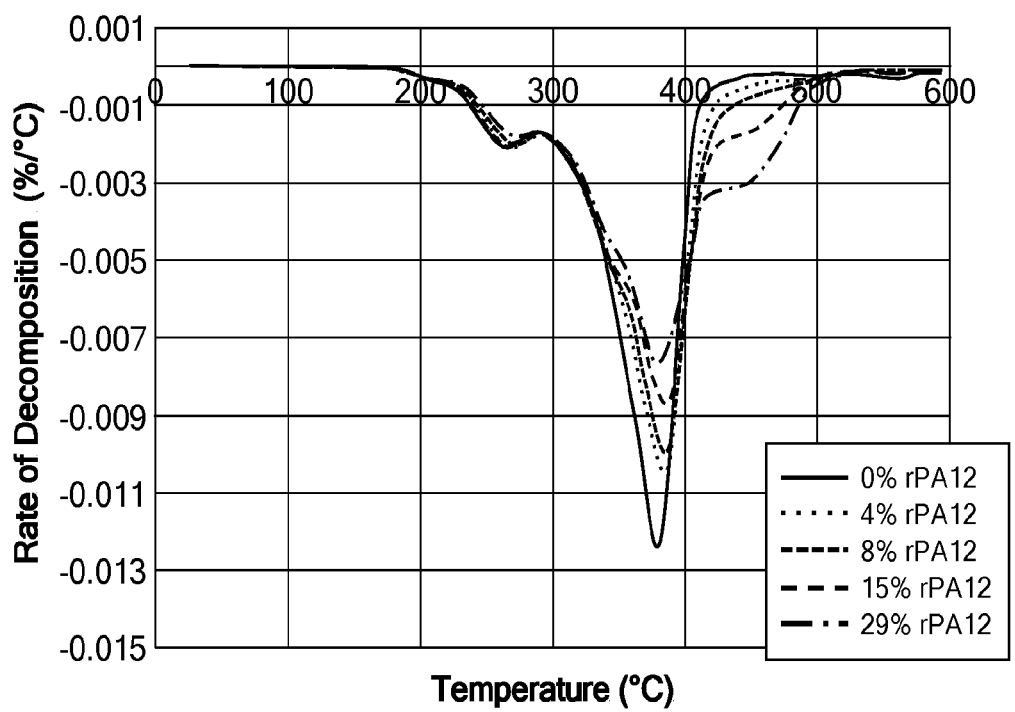
FIG. 8A is rate of decomposition (DTG) curves for rPA12 filler and $CO_2$ foams with 0 to 29% rPA12 filler.
Figure 8B:
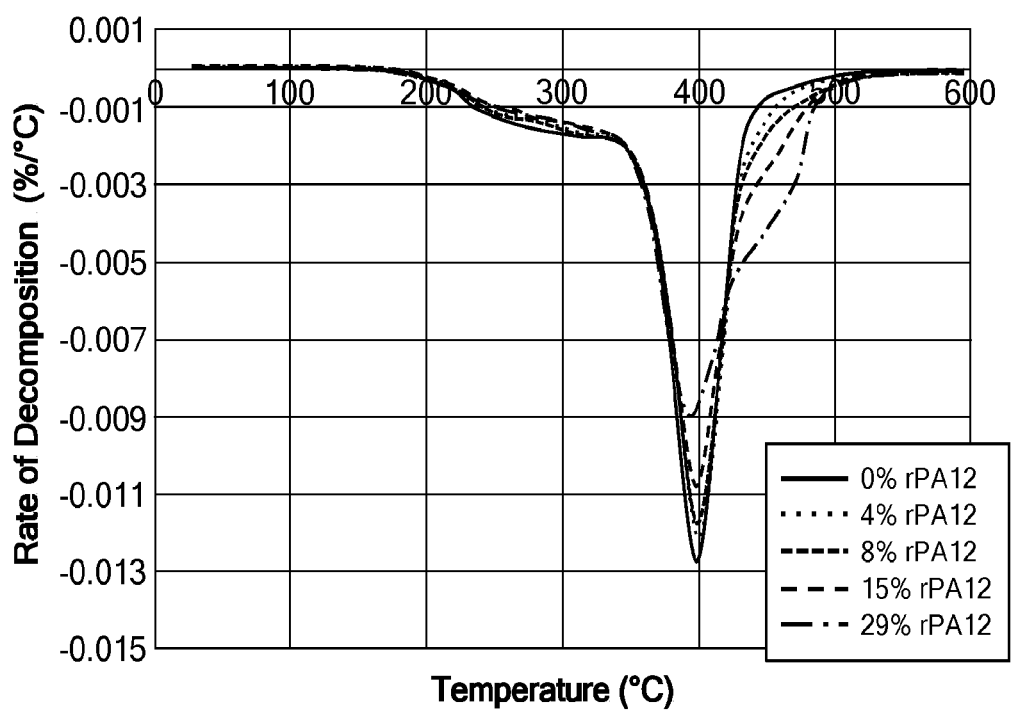
FIG. 8B is rate of decomposition (DTG) curves for rPA12 filler and soy foams with 0 to 29% rPA12 filler.

Referring to FIGS. 8A and 8B, the maximum rate of mass loss was found at the absolute minimum of each DTG curve. Additionally, the DTG curves of $CO_2$ samples showed local extrema between 260 and 300° C., of which local minima were found between 265° C. to 275° C. and local maxima were found between 288° C. and 292° C. for $CO_2$ foams containing 0% to 15% rPA12 filler. $CO_2$ foams containing 29% rPA12 filler and all soy foams did not exhibit local extrema. These local extrema correlate to the degradation of urethane and urea linkages.

Maximum Rates of Decomposition—In both foam sets utilizing sustainable polyols, the absolute value of the maximum rate of decomposition decreased significantly with increasing rPA12 filler content. The largest change was found at the 29% level of filler in both sample sets, decreasing by 38% and 29% compared to their respective control samples. This value corresponds to overall thermal stability of the foam material, and these results indicate that this property was enhanced through the addition of rPA12 filler, demonstrated by the lower maximum rates of mass loss.

Temperatures at maximum rate of decomposition, located on the DTG curve where rate of decomposition is at a minimum (most negative), can be used to compare thermal stabilities between different formulations of flexible PU foams.

In the $CO_2$ foam samples, the maximum rate of decomposition temperature changed with statistical significance in the 4%, 8%, and 15% levels of rPA12 filler, increasing by 1%, 1%, and 2% over the $CO_2$ control sample, respectively. The 29% filler $CO_2$ foam sample did not show a significant change. In the soy foam samples, only the 29% rPA12 filler temperature values showed a statistically significant difference, decreasing by 1% over the soy control sample. Due to the conflicting nature of the $CO_2$ and soy foam results, where maximum rate of decomposition temperature increased slightly for most $CO_2$ samples but decreased slightly in soy samples, there can be no clear conclusions drawn about the relationship between this temperature and rPA12 filler content. Since the $CO_2$ polyol structure contains a polycarbonate backbone, this variable may have obscured this relationship, as the soy polyol chosen has a polyester structure.

A high-performing, sustainable polyurethane material comprising foam formulations containing recycled rPA12 powder as a filler dispersed in petroleum-based polyether polyols or, $CO_2$ and soy based polyols as a partial substitute for petroleum-based polyether polyols, are provided. This leftover PA12 powder is traditionally fated to be landfill waste, however the foams, foam parts, and methods for making the foams and foam parts in accordance with the teachings of the present disclosure embrace closed-loop recycling and incorporate this waste into a widely used automotive component, i.e., foam. Using the powder in soy- and $CO_2$-substituted polyol formulations of 25%, these foams also implement bio-based materials. The results show high capability for use within certain automotive applications, such as insulation or under-hood engine covers.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The description of the disclosure is merely exemplary in nature and, thus, variations that do not depart from the substance of the disclosure are intended to be within the scope of the disclosure. Such variations are not to be regarded as a departure from the spirit and scope of the disclosure.

As used herein, the phrase at least one of A, B, and C should be construed to mean a logical (A OR B OR C), using a non-exclusive logical OR, and should not be construed to mean "at least one of A, at least one of B, and at least one of C.

What is claimed is:

1. A process of manufacturing a foam part comprising:
dispersing a filler consisting of material recycled from an additive manufacturing (AM) process in at least one foam reactant; and
pouring or injecting the at least one foam reactant with the filler material into a mold and forming the foam part, wherein the foam part comprises a foam matrix with greater than or equal to 2.5 wt. % and less than or equal to 8 wt. % of the filler material.

2. The process of claim 1, wherein the filler material is a recycled powder from a selective laser sintering (SLS) process.

3. The process of claim 1, wherein the filler material is a recycled polyamide (rPA) powder.

4. The process of claim 1, wherein the filler material is a recycled polyamide 12 (rPA12) powder.

5. The process of claim 1, wherein the filler material is a recycled powder from a selective laser sintering (SLS) process that is not graded before being dispersed in the at least one foam reactant.

6. The process of claim 1, wherein the at least one foam reactant comprises a polyol and an isocyanate polyurethane (PU) foam reactants.

7. The process of claim 6, further comprising synthesizing the polyol from $CO_2$.

8. The process of claim 6, further comprising synthesizing the polyol from a natural oil source.

9. The process of claim 6, further comprising synthesizing the polyol from petroleum.

10. The process of claim 1, wherein the foam part comprises a polyurethane foam with at least 2.5% rPA12 dispersed in polyurethane reactants.

11. The process of claim 1, wherein the process is a closed loop recycling process.

12. The process of claim 1, wherein the foam part produced is a polyurethane (PU) foam that includes an open-cell, flexible matrix.

13. The process of claim 12, wherein the open-cell, flexible matrix includes cells having a size less than 400 μm.

14. The process of claim 1, wherein the at least one foam reactant corresponds to polyurethane (PU) foam reactants and wherein the filler material is not graded prior to being dispersed in the PU foam reactants.

15. A foam comprising:
a polyurethane foam matrix; and
a filler material consisting of waste from an additive manufacturing process, wherein the waste from the additive manufacturing process includes recycled powders having an average diameter of less than 100 microns.

16. The foam of claim 15, wherein the waste from the additive manufacturing process comprises recycled polyamide 12 (rPA12) powder from a selective laser sintering (SLS) process.

17. The foam of claim 15, wherein a concentration of the flexible foam comprises between 2.5 wt. % and 30 wt. % rPA12 powder.

18. The flexible foam of claim 15, wherein the polyurethane foam matrix is formed from reactants comprising a polyol and an isocyanate.

19. The flexible foam of claim 15, wherein the foam part comprises a polyurethane foam with up to 30% rPA12 dispersed in polyurethane reactants.

20. The flexible foam of claim 15, wherein the foam part comprises a foam matrix with greater than or equal to 2.5 wt. % and less than or equal to 8 wt. % of the filler material.

* * * * *